(12) United States Patent
Kinoshita et al.

(10) Patent No.: US 10,050,807 B2
(45) Date of Patent: Aug. 14, 2018

(54) NETWORK SYSTEM, METHOD OF MANAGING NETWORK SYSTEM AND GATEWAY APPARATUS

(71) Applicant: Hitachi, Ltd., Tokyo (JP)

(72) Inventors: Junji Kinoshita, Tokyo (JP); Kazuhiro Maeda, Tokyo (JP); Osamu Takada, Tokyo (JP)

(73) Assignee: Hitachi, Ltd., Tokyo (JP)

(*) Notice: Subject to any disclaimer, the term of this patent is extended or adjusted under 35 U.S.C. 154(b) by 235 days.

(21) Appl. No.: 14/941,771

(22) Filed: Nov. 16, 2015

(65) Prior Publication Data
US 2016/0149758 A1 May 26, 2016

(30) Foreign Application Priority Data
Nov. 21, 2014 (JP) ................... 2014-236217

(51) Int. Cl.
*H04L 12/46* (2006.01)
*H04L 12/24* (2006.01)

(52) U.S. Cl.
CPC ...... *H04L 12/4641* (2013.01); *H04L 41/0226* (2013.01); *H04L 41/0816* (2013.01); *H04L 41/0896* (2013.01); *H04L 41/5096* (2013.01)

(58) Field of Classification Search
CPC ............. H04L 12/4641; H04L 41/0226; H04L 41/0816; H04L 41/0896; H04L 41/5096
See application file for complete search history.

(56) References Cited

U.S. PATENT DOCUMENTS

| 7,515,589 B2 | 4/2009 | Bacher et al. |
| 8,223,770 B2 | 7/2012 | Wray et al. |

(Continued)

FOREIGN PATENT DOCUMENTS

| JP | 2009-135805 A | 6/2009 |
| WO | 2007/146274 A2 | 12/2007 |

OTHER PUBLICATIONS

"MAC Bridges and Virtual Bridged Local Area Networks—Amendment XX: Edge Virtual Bridging", IEEE P802.1Qbg/D2.2, Feb. 18, 2012.

(Continued)

*Primary Examiner* — Dustin Nguyen
*Assistant Examiner* — Javier O Guzman
(74) *Attorney, Agent, or Firm* — Mattingly & Malur, PC

(57) ABSTRACT

A network system, having: a gateway apparatus set in a network; a physical computer coupled to the gateway apparatus; a virtualization unit that allocates computer resources of the physical computer to virtual machines; and a management computer that manages the physical computer, the virtualization unit, and the gateway apparatus, wherein the management computer includes: a network mapping unit that controls the gateway apparatus by configuring settings in a virtual network and another gateway apparatus and a VLAN coupled to the virtual network; and a virtualization management unit that controls the virtualization unit, wherein the virtualization unit includes: a virtual port coupled to the virtual machines; and a virtual switch that configures settings for the VLAN coupling the virtual port to the gateway apparatus, and wherein the gateway apparatus converts transmissions between a format of the VLAN and a format of the virtual network and performs transmission.

14 Claims, 13 Drawing Sheets

(56) References Cited

U.S. PATENT DOCUMENTS

| | | |
|---|---|---|
| 2007/0287390 A1 | 12/2007 | Murphy et al. |
| 2011/0274110 A1* | 11/2011 | Mmmadi ............... H04L 49/30 370/392 |
| 2011/0299534 A1* | 12/2011 | Koganti ............. H04L 12/4625 370/392 |
| 2012/0331142 A1* | 12/2012 | Mittal .................. H04L 49/354 709/225 |
| 2013/0034021 A1* | 2/2013 | Jaiswal .............. H04L 12/4641 370/255 |
| 2013/0058215 A1 | 3/2013 | Koponen et al. |
| 2013/0125112 A1* | 5/2013 | Mittal ................ H04L 41/0813 718/1 |
| 2013/0276092 A1* | 10/2013 | Sun .................... H04L 63/0227 726/13 |
| 2014/0169215 A1* | 6/2014 | Rajendran ........... H04L 41/0806 370/254 |
| 2014/0337497 A1 | 11/2014 | Wanser et al. |
| 2014/0341029 A1* | 11/2014 | Allan .................... H04L 47/125 370/235 |
| 2014/0364130 A1 | 12/2014 | Murphy et al. |
| 2015/0036505 A1* | 2/2015 | Sparks .................... H04L 47/11 370/236 |
| 2015/0180773 A1* | 6/2015 | DeCusatis ........... H04L 12/4641 370/392 |
| 2016/0350151 A1* | 12/2016 | Zou ..................... G06F 9/45558 |

OTHER PUBLICATIONS

Japanese Office Action received in corresponding Japanese Application No. 2014-236217 dated Jun. 5, 2018.

\* cited by examiner

32 NETWORK MAPPING TABLE

| VIRTUAL NETWORK ID | GATEWAY ID | LOCAL VIRTUAL NETWORK ID | INTERMEDIATE INTERFACE ID | VLAN DOMAIN ID | VLAN ID | PORT ID |
|---|---|---|---|---|---|---|
| x | 2-1 | i | M | A | X | ww |
| x | 2-1 | i | M | A | Y | ww |
| y | 2-1 | j | N | A | Z | xx |
| y | 2-2 | i | M | B | X | yy |
| x | 2-2 | j | N | C | X | zz |
| y | 2-2 | i | M | C | Y | zz |
| ... | | | | | | ... |

Fig. 5

33 CONFIGURATION INFORMATION TABLE

| GATEWAY ID | VLAN DOMAIN ID | VLAN ID | PORT ID | HOST ID | VIRTUAL SWITCH ID | VIRTUAL PORT ID | VIRTUAL MACHINE ID |
|---|---|---|---|---|---|---|---|
| 2-1 | A | X | ww | 4-1 | 40-1 | P | 6-1 |
| 2-1 | A | Y | ww | 4-1 | 40-1 | Q | 6-2 |
| 2-1 | A | Z | xx | 4-2 | 40-2 | R | 6-3 |
| 2-1 | A | Z | xx | 4-2 | 40-2 | R | 6-4 |
| 2-2 | B | W | yy | 4-3 | 40-3 | P |  |
| 2-2 | B | X | yy | 4-3 | 40-3 | Q | 6-5 |
| 2-2 | C | X | zz | 4-4 | 40-4 | P | 6-6 |
| 2-2 | C | Y | zz | 4-4 | 40-4 | Q | 6-7 |

Fig. 6

34 OFFLOAD NECESSITY DETERMINATION TABLE

| USER ID | VIRTUAL NETWORK ID | OFFLOAD NECESSITY SCORE |
|---|---|---|
| ... | i | NECESSARY |
|  |  |  |
| ... |  |  |

Fig. 7

NETWORK SYSTEM, METHOD OF MANAGING NETWORK SYSTEM AND GATEWAY APPARATUS

CLAIM OF PRIORITY

The present application claims priority from Japanese patent application JP 2014-236217 filed on Nov. 21, 2014, the content of which is hereby incorporated by reference into this application.

BACKGROUND

The present invention relates to a network of a data center in which a plurality of virtual machines are coupled through a plurality of network apparatuses.

In recent years, use of data centers in applications such as cloud services has been developing in order for individuals, corporations, and organizations to utilize computer resources and applications in a flexible and inexpensive manner.

In such data centers, many host computers and resources such as storage and appliances (firewalls, load balancers, management apparatuses, and the like) are coupled through a network to more than one data center at times.

Also, it is in general practice to consolidate resources using server virtualization techniques and improve resource efficiency and resource mobility in order to provide such resources rapidly and at low cost.

In data centers, it is necessary to on the one hand couple resources of the same user while on the other hand separating resources of different users, and conventionally, a technique known as a virtual local area network (VLAN) in which identifiers are assigned to transmission packets to logically separate networks was used in order to couple and separate resources.

However, as a result of advances in resource consolidation due to server virtualization techniques, deficiencies of VLAN have become a problem.

Additionally, in a server virtualization environment, virtual machines are coupled to virtual switches installed as software on a host computer, and thus, maintaining transmission performance particularly between virtual machines and monitoring such transmissions has become a problem.

Various solutions have been considered in order to deal with deficiencies of VLAN and problems of data centers such as maintaining transmission performance between virtual machines and monitoring such transmissions.

Network virtualization techniques have been considered in order to deal with deficiencies of VLAN. For example, Patent Documents 1, 2, and 3 disclose network virtualization technique in which a virtual switch on a host computer is used in order to encapsulate transmissions between virtual machines.

Also, a technique of realizing higher transmission performance between virtual machines and collective monitoring of a network by performing switching processes for transmission between virtual machines using physical network apparatuses (hereinafter referred as "hardware offloading" or simply as "offloading") has been considered in order to maintain transmission performance between virtual machines and monitoring of such transmissions, and offloading has been disclosed in Patent Document 4 and Non-Patent Document 1, for example.

Patent Document 1: US Patent Application Publication No. 2013/0058215

Patent Document 2: U.S. Pat. No. 7,515,589

Patent Document 3: U.S. Pat. No. 8,223,770

Patent Document 4: WO 2007/146274

Non-Patent Document

Non-Patent Document 1: IEEE P802.1Qbg/D2.2

SUMMARY

Even if any or all of the technique disclosed in Patent Documents 1 to 4 and Non-Patent Document 1 were combined, it would still not be possible to realize high performance and a highly reliable network virtualization regardless of the presence or absence of a server virtualization unit such as a hypervisor or the type thereof.

Specifically, in the network virtualization technique disclosed in Patent Documents 1, 2, and 3, for example, transmissions between virtual machines are done by a virtual switch implemented as software on the host computer, and thus, can only be used in a server virtualization environment. Also, network virtualization methods can differ depending on the type of server virtualization unit such as a hypervisor. In a real environment, there are cases in which server virtualization is not used or in which a plurality of types of hypervisors are used, and such network virtualization technique cannot handle such a variety of environments. Furthermore, such network virtualization consumes computer resources of the host computer, and thus, cannot be used for applications that require high performance.

Also, in the offloading technique disclosed in Patent Document 4 and Non-Patent Document 1, the virtualization unit such as the hypervisor that realizes server virtualization on a host computer requires a mechanism for offloading transmission between virtual machines, and if the hypervisor does not support such functions, offloading is not possible. Currently, hypervisors in general use in the market sometimes do not support such functions, and thus, offloading is generally not possible.

Thus, there has been a problem in data centers up to now in that it has not been possible to realize high performance and highly reliable network virtualization regardless of the presence or absence of a server virtualization unit such as a hypervisor or the type thereof.

An object of the present invention is to perform transmission between virtual machines while reducing computing resources of the host computer regardless of the type of virtualization unit such as a hypervisor.

A representative aspect of this invention is as follows. A network system, comprising: a gateway apparatus set in a network; a physical computer coupled to the gateway apparatus; a virtualization unit that allocates computer resources of the physical computer to a plurality of virtual machines; and a management computer that manages the physical computer, the virtualization unit, and the gateway apparatus, wherein the management computer includes: a network mapping unit that controls the gateway apparatus by configuring settings in a virtual network coupled to the gateway apparatus and another gateway apparatus through the network and a VLAN coupled to the virtual network; and a virtualization management unit that controls the virtualization unit on the basis of the settings by the network mapping unit, wherein the virtualization unit includes: a virtual port coupled to the virtual machines; and a virtual switch that configures settings for the VLAN coupling the virtual port to the gateway apparatus, and wherein the gateway apparatus converts transmissions between a format of the VLAN and a format of the virtual network and performs transmission with another gateway apparatus coupled through the virtual network, on the basis of commands from the network mapping unit.

Thus, according to the present invention, it is possible to realize a high performance and highly reliable virtual network by performing transmission between virtual machines while reducing computing resources of the host computer regardless of the type of virtualization unit.

BRIEF DESCRIPTION OF THE DRAWINGS

FIG. 5 is a diagram for illustrating an example of a network mapping table according to the first embodiment of this invention.

FIG. 6 is a diagram for illustrating an example of a configuration information table according to the first embodiment of this invention.

FIG. 7 is a diagram for illustrating an example of an offload necessity determination table according to the first embodiment of this invention.

DETAILED DESCRIPTION OF THE PREFERRED EMBODIMENTS

Below, an embodiment of the present invention will be described. The present invention is not limited to this embodiment.

Figure 1:
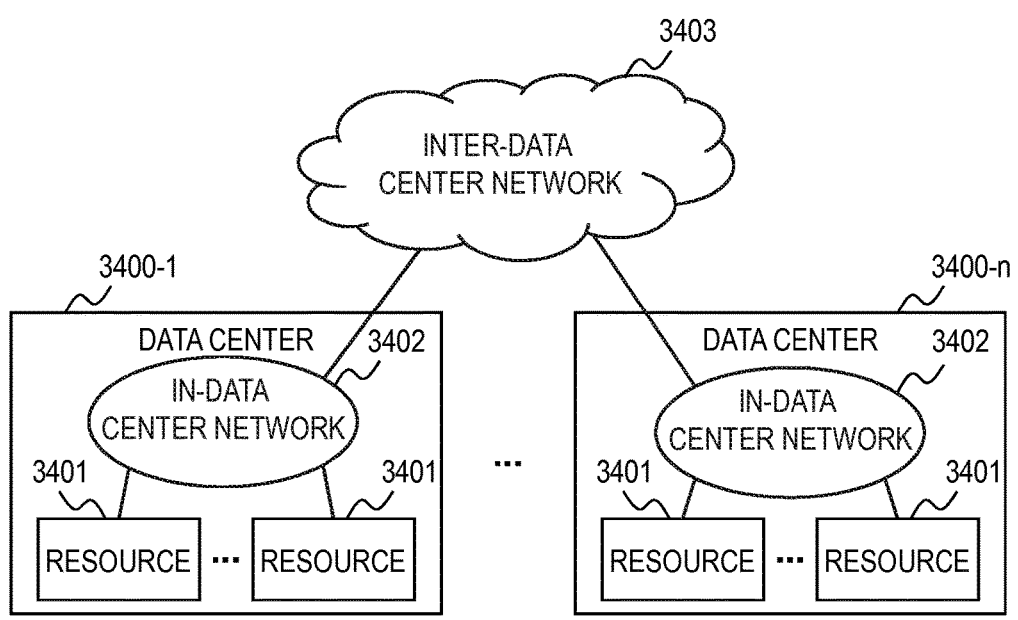
FIG. 1 is a block diagram for illustrating an example of a hypothetical environment of a network virtualization system according to a first embodiment of this invention.

FIG. 1 is a block diagram showing one example of a hypothetical environment of a network virtualization system to which the present invention is applied. A network virtualization system is a computer system comprised of one or more data centers 3400-1 to 3400-n including one or more resources 3401.

The resources 3401 are computers such as host computers, storage, and appliances (firewalls, load balancers, management apparatus, etc.).

The data centers 3400-1 to 3400-n are buildings, floors in the buildings, areas in the floors, racks, or the like in which multiple resources 3401 are disposed. Below, data centers will collectively be referred to with the reference character 3400 without "-". The same applies to reference characters of other components, such that when collectively referring to such components the "-" is omitted and additional characters are added when specifying individual components.

In the data centers 3400, the resources 3401 are coupled to an in-data center network 3402. The in-data center network 3402 is a LAN (local area network), for example.

Additionally, the data centers 3400 are coupled to a data center network 3403. The inter-data center network 3403 is a WAN (wide area network), for example.

Figure 2:
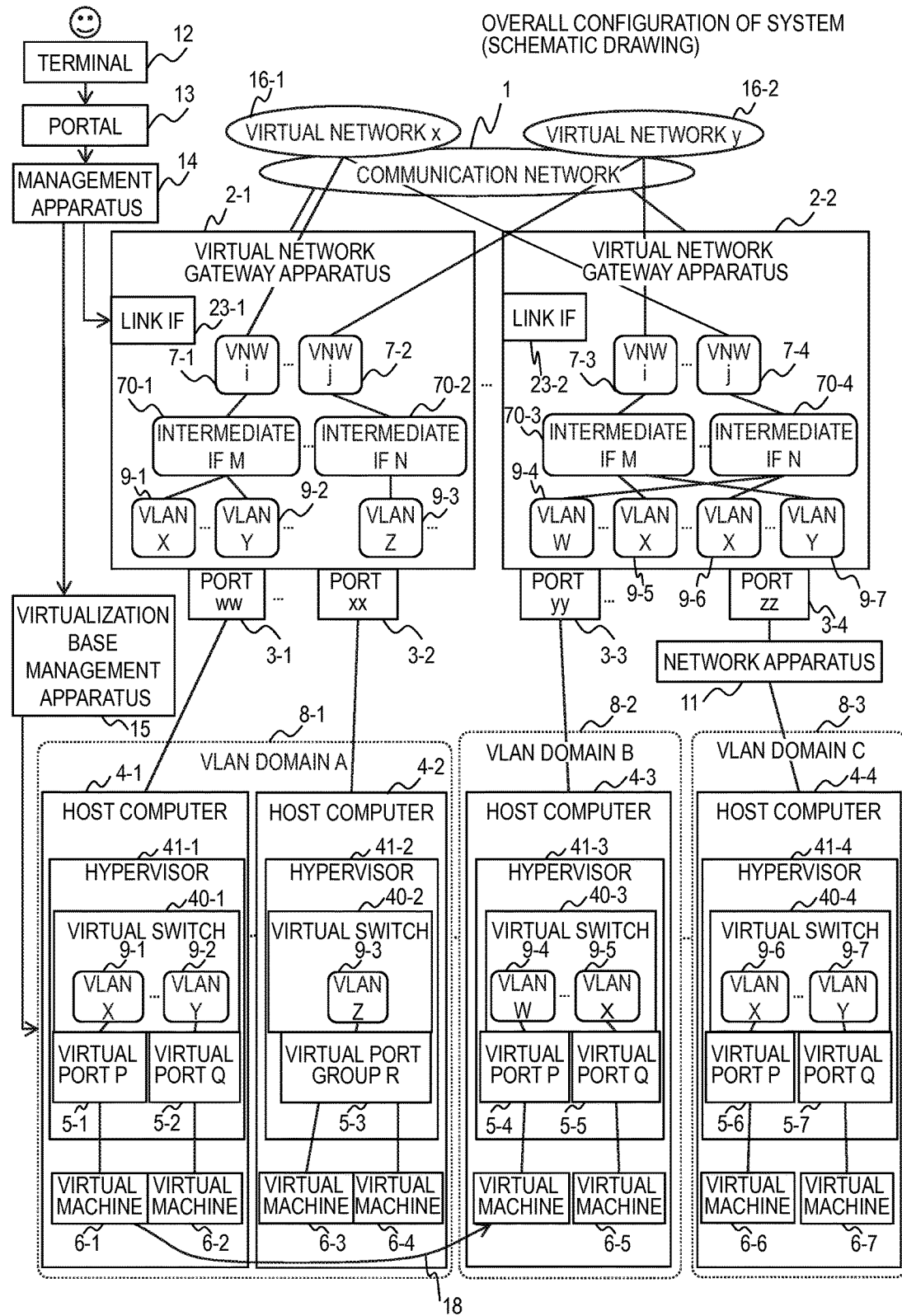
FIG. 2 is a block diagram for illustrating an example of an overall configuration of the network virtualization system according to the first embodiment of this invention.

FIG. 2 is a block diagram showing one example of an overall configuration of the network virtualization system.

The network virtualization system includes one or more virtual network gateway apparatuses 2-1 and 2-2 coupled through one or more communication networks 1, and one or more host computers 4-1 to 4-4 (physical computers) coupled to the virtual network gateway apparatuses 2 through one or more ports 3-1 to 3-4 either directly or additionally through one or more network apparatuses 11.

The network virtualization system may additionally include one or more virtual switches 40-1 to 40-4 that operate on the host computers 4 and are coupled to the virtual network gateway apparatuses 2 or the network apparatuses 11, and virtual machines 6-1 to 6-7 that operate on the host computer 4 and that are coupled to the virtual switches 40 through one or more virtual ports 5-1, 5-2, and 5-4 to 5-7 or one or more virtual port groups 5-3. The network virtualization system can also include host computers 4 to which the server virtualization technique has not been applied. In the embodiment below, a case in which the server virtualization technique is applied to the host computers 4 will be described.

The network virtualization system further includes: one or more VLAN domains 8-1 to 8-3 to which one or more VLANs to which the host computers 4 and virtual machines 6 are coupled belong; a virtualization base management apparatus 15 that manages the host computers 4 and the virtual switches 40, the virtual ports 5, and the virtual machines 6 on the host computer 4; a management apparatus 14 that manages the virtual network gateway apparatuses 2 through link IFs 23-1 to 23-2 of the virtual network gateway apparatuses 2 and manages the host computers 4 and the virtual switches 40, the virtual ports 5, and the virtual machines 6 on the host computers 4 in coordination with the virtualization base management apparatus 15; and a user-operated terminal 12.

The management apparatus 14 is coupled respectively to the virtualization base management apparatus 15 and the virtual network gateway apparatuses 2. Also, the virtualization base management apparatus 15 is coupled respectively to the host computers 4-1 to 4-4.

The communication network 1 is a network on which transmissions of the virtual machines 6, which have been virtualized by the virtual network gateway apparatuses 2, and transmissions of the host computers 4 are performed, the communication network 1 corresponding to the in-data center network 3402 or the inter-data center network 3403, and can encompass one or more data centers 3400. In the embodiment below, a case will be described in which one data center is controlled by the virtual network gateway apparatuses 2.

The virtual network gateway apparatuses 2 are network apparatuses that receive commands from the management apparatus 14 and couple one or more VLANs 9-1 to 9-7 of the one or more VLAN domains 8 through intermediate IFs 70-1 to 70-4, and couple the one or more VLANs 9 of the one or more VLAN domains 8 to the virtual networks 16. The intermediate IFs 70 couple one or more VLANs 9 to one virtual network 16, and convert transmissions between the VLANs 9 and the virtual network 16 to the format of the destination of the transmission. By the intermediate IFs 70 coupling the VLANs 9 to the virtual network 16 through a local virtual network 7 (VNW), it is possible for a certain virtual network gateway apparatus 2 to convert identifying information of a unique virtual network 16 with another virtual network gateway apparatus 2 to unique identifying information (local virtual network 7) in the virtual network gateway apparatus 2. In the embodiment below, a case in which there is a local virtual network 7 will be described as an example, but this patent is not limited to such a configuration, and the VLANs 9 may be mapped to the virtual network 16 through the intermediate IF 70.

The VLAN 9 is a well-known technique for logically separating networks by assigning identifiers to transmitted packets, and the VLAN domain 8 is a range in which identifiers can be uniquely assigned to the VLANs 9 without any overlap.

The intermediate IFs 70-1 to 70-4 of the virtual network gateway apparatuses 2 are loopback interfaces, for example, and are logically defined in the virtual network gateway apparatuses 2.

The virtual network 16 is a technique for logically separating transmissions by encapsulation of transmissions, assigning identifiers, or the like, and can be realized by a well-known technique such as overlay virtualization including a virtual extensible local area network (VXLAN), generic routing encapsulation (GRE), network virtualization using GRE (NVGRE), and stateless transport tunneling (STT); and hop-by-hop virtualization such as slicing, provider backbone bridge (PBB), multiprotocol label switching (MPLS), Q-in-Q, and MAC-in-MAC (media access control).

The network apparatus 11 is a layer 2 switch or a layer 3 switch, a router, a firewall, a load balancer, or the like. In FIG. 2, an example was described in which the network apparatus 11 is disposed between the virtual network gateway apparatus 2-2 and the host computer 4-4, but a configuration that omits the network apparatus 11 may be adopted. Alternatively, the network apparatus 11 may be disposed between other host computers 4-1 to 4-3 and the virtual network gateway apparatus 2.

A hypervisor 41-1 (virtualization unit) operates in the host computer 4-1. The hypervisor 41-1 divides computer resources of the host computer 4-1 and allocates them to the virtual machines 6-1 and 6-2, and operates the respective virtual machines 6. Also, the hypervisor 41-1 provides virtual ports 5-1 and 5-2 coupled to the virtual machines 6-1 and 6-2, and provides a virtual switch 40-1 that controls transmissions between the virtual ports 5. Additionally, the hypervisor 41-1 can allocate the VLANs 9-1 and 9-2 respectively to the virtual ports 5-1 and 5-2 on the basis of commands from the virtualization base management apparatus 15 or the like.

In the host computer 4-2, the hypervisor 41-2 provides a virtual port group 5-3 coupled to the virtual machines 6-3 and 6-4, and provides a virtual switch 40-2 that controls transmissions among the virtual port group 5-3. The host computers 4-3 and 4-4 have a similar configuration to the host computer 4-1.

The user operating the terminal 12 is a cloud user, a tenant manager, or a cloud manager who constructs or operates business systems using the virtual machines 6, for example.

The management apparatus 14 allocates a different VLAN 9 to each virtual machine 6 in each individual VLAN domain 8 through the virtualization base management apparatus 15.

The management apparatus 14 maps the one or more VLANs 9 of the one or more VLAN domains 8 to the virtual networks 16 through the intermediate IFs 70 in each virtual network gateway apparatus 2, and couples the virtual networks 16-1 and 16-2 between the virtual network gateway apparatuses 2-1 and 2-2 through the communication network 1.

The management apparatus 14 realizes a virtual network 16 coupling host computers 4 or virtual machines 6 on the host computers 4 across one or more VLAN domains 8 or one or more data centers 3400, and enables offloading (hardware offloading) of switching process for transmissions between virtual machines 6 from the virtual switches 40 to the virtual network gateway apparatuses 2.

Also, the management apparatus 14 allocates the same VLAN 8 to one or more virtual machines 6 on the same host computer 4 through the virtualization base management apparatus 15 according to a request from the terminal 12 operated by a user to enable modification of transmission between the virtual machines 6 so as to be able to perform switching using the virtual switches 40 if virtual machines 6 coupled to a certain virtual network 16 are present on the same host computer 4.

Furthermore, the management apparatus 14 detects movement 18 (migration or the like) of the virtual machine 6-1 through the virtualization base management apparatus 15, and generates a virtual port 5-4(P) in the virtual switch 40-3 on the destination host computer 4-3 using the virtual port name (P) for when the virtual machine 6-1 is coupled to the virtual switch 40-1 on the source host computer 4-1. A virtual port 5-4 of the same identifier (P) as the identifier (P) of the virtual port 5-1 provided by the source virtual switch 40 is allocated to the virtual machine 6-1 to be migrated. In this manner, the virtual machine 6-1 to be migrated can continue to operate at the destination without modifying settings.

A VLAN 9 usable in the destination VLAN domain 8-2 is allocated to the virtual port 5-4, and the VLAN 9 is coupled to the virtual network 16 through the intermediate IF 70 in the virtual network gateway apparatus 2-2 such that the VLAN 9 is coupled to the same virtual network 16 as prior to migration, and thus, in the network virtualization system of the present invention, the virtual machine 6 can be migrated while being coupled to the same virtual network 16 across one or more VLAN domains 8 and one or more data centers 3400.

In FIG. 2, for example, the virtual machine 6-1 is coupled to the virtual switch 40-1 through the virtual port P(5-1) and is coupled to the VLAN X(9-1) of the VLAN domain A(8-1).

Similarly, the virtual machine 6-2 is coupled to the VLAN Y(9-2) of the VLAN domain A(8-1) and the virtual machines 6-3 and 6-4 are coupled to the same VLAN Z(9-3) through the same virtual port group R(5-3).

The virtual machine 6-5 is coupled to the VLAN X(9-5) of the VLAN domain B(8-2). The virtual machines 6-6 and 6-7 are respectively coupled to the VLAN X(9-6) and the VLAN Y(9-7) of the VLAN domain C(8-3).

The VLAN X(9-1) and the VLAN Y(9-2) of the VLAN domain A(8-1) are logically separated in the virtual switch 40-1, and thus, are not coupled to each other in the virtual switch 40-1, and are forwarded to the virtual network gateway apparatus 2-1 through a port ww(3-1) while being assigned VLAN identifiers.

The virtual machines 6-3 and 6-4 are coupled to the same VLAN Z(9-3) on the virtual switch 40-2, and thus, transmissions between the virtual machines 6-3 and 6-4 are switched in the virtual switch 40-2. Meanwhile, transmissions of the VLAN Z(9-3) are forwarded to the virtual network gateway apparatus 2-1 through a port xx(3-2) while being assigned a VLAN identifier.

The VLAN X(9-5) of the VLAN domain B(8-2) is forwarded to the virtual network gateway apparatus 2-2 through a port yy(3-3) while being assigned a VLAN identifier.

The VLAN X(9-6) and the VLAN Y(9-7) of the VLAN domain C(8-3) are logically separated in the virtual switch 40-4, and thus, are not coupled to each other, and are forwarded to the virtual network gateway apparatus 2-2 through a port zz(3-4) while being assigned VLAN identifiers.

In the virtual network gateway apparatus 2-1, the VLAN X(9-1) and the VLAN Y(9-2) of the VLAN domain A(8-1), and the local virtual network VNW i(7-1) are coupled to each other through the intermediate IF M(70-1).

The VLAN Z(9-3) and local virtual network VNW j(7-2) of the VLAN domain A(8-1) are coupled to each other though the intermediate IF N(70-2).

In the virtual network gateway apparatus 2-2, the VLAN X(9-5) of the VLAN domain B(8-2) and the VLAN Y(9-7) of the VLAN domain C(8-3), and the local virtual network VNW i(7-3) are coupled to each other through the intermediate IF M(70-3).

The VLAN X(9-6) and local virtual network VNW j(70-4) of the VLAN domain C(8-3) are coupled to each other though the intermediate IF N(7-4).

The local virtual network VNW i(7-1) of the virtual network gateway apparatus 2-1 and the local virtual network VNW j(70-4) of the virtual network gateway apparatus 2-2 are associated with the upper level virtual network x(16-1).

The local virtual network VNW j(7-2) of the virtual network gateway apparatus 2-1 and the local virtual network VNW i(7-3) of the virtual network gateway apparatus 2-2 are associated with the upper level virtual network y(16-2).

In this manner, the virtual machine 6-1 and virtual machine 6-2, and the virtual machine 6-6 are coupled to each other on the same virtual network x(16-1) on a communication network 1 across one or more VLAN domains A to C(8-1 to 8-3) and one or more data centers 3400 to 3400-n.

Also, the virtual machine 6-3 and virtual machine 6-4, the virtual machine 6-5, and the virtual machine 6-7 are coupled on the same virtual network y(16-2).

The virtual machine 6-1 and the virtual machine 6-2 are coupled to the same virtual switch 40-1 on the same host computer 4-1, but transmissions between the virtual machines 6 are not switched in the virtual switch 40-1, but are switched in the virtual network gateway apparatus 2-1 through the port ww(3-1). In this manner, a transmission forwarding process between virtual machines using software on the virtual switch 40-1 is no longer required in the hypervisor 41-1, and thus, it is possible to prevent a decrease in processing performance of the host computer 4-1.

Meanwhile, the virtual machine 6-3 and the virtual machine 6-4 are coupled to the same VLAN Z(9-3) through the same virtual port group R(5-3) in the same virtual switch 40-2 on the same host computer 4-2. Thus, among the virtual machines coupled to the same virtual network y(16-2), transmissions between the virtual machine 6-3 and the virtual machine 6-4 are switched by the virtual switch 40-2 and not the virtual network gateway apparatus 2-1.

A case will be described in which the management apparatus 14 and the virtualization base management apparatus 15 migrates (18) the virtual machine 6-1 coupled to the VLAN X(9-1) of the VLAN domain A(8-1) through the virtual port P(5-1) on the host computer 4 to a host computer 4-3 of a different VLAN domain B(8-2). When moving the virtual machine 6, a migration request from the terminal 12 may be issued as a notification from the portal 13 and the management apparatus 14 to the virtualization base management apparatus 15. Alternatively, the management apparatus 14 may decide to migrate the virtual machine 6 and issue a request to the virtualization base management apparatus 15.

A different VLAN from prior to migration of the virtual machine 6-1 is allocated to the virtual machine 6-1 after migration thereof (VLAN W(9-4) in FIG. 2), and by the management apparatus 14 generating a virtual port P(5-4) having the same virtual port name as prior to migration in the virtual switch 40-3 and coupling the virtual machine 6-1 to this virtual port P through the virtualization base management apparatus 15, it is possible to migrate the virtual machines 6 and couple them to a different VLAN 9.

In the virtual network gateway apparatus 2-2, the VLAN W(9-4) of the VLAN domain B(8-2) is mapped to the intermediate IF N(70-4), and thus, the virtual machine 6-1 continues to be coupled to the same virtual network x(16-1) as prior to migration even after moving to a different VLAN domain B(8-2).

Figure 3:
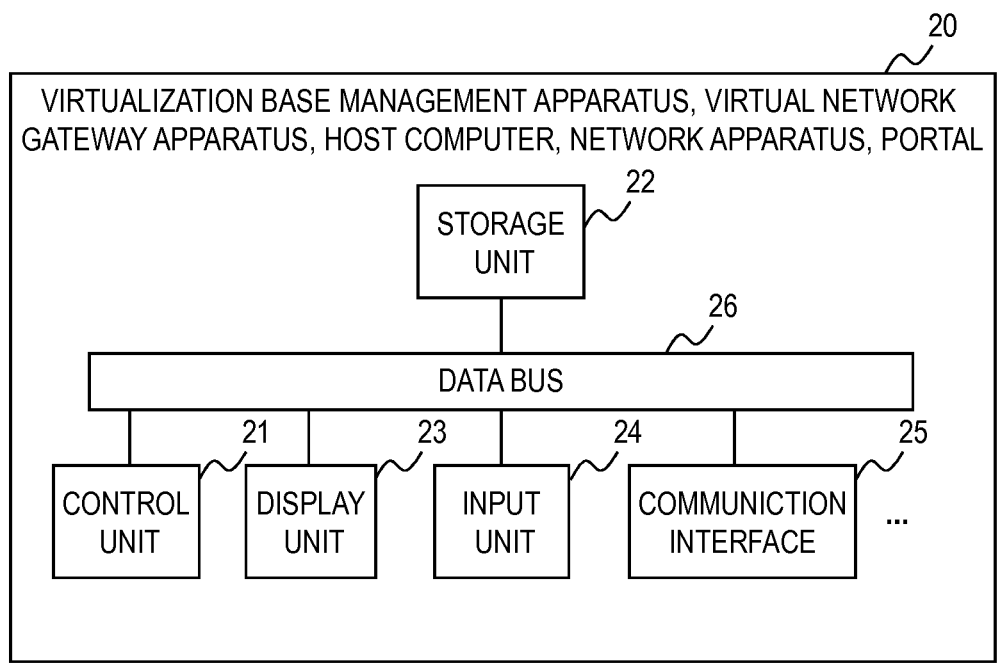
FIG. 3 is a block diagram for illustrating an example of a virtualization base management apparatus, a virtual network gateway apparatus, a host computer, a network apparatus, a portal and a terminal according to the first embodiment of this invention.

FIG. 3 shows an example of a hardware configuration of the virtualization base management apparatus 15, the virtual network gateway apparatus 2, the host computer 4, the network apparatus 11, the portal 13, and the terminal 12. In this drawing, these devices are collectively referred to as devices 20.

The devices 20 can be comprised of a control unit 21 that is a CPU (central processing unit) or the like, a storage unit 22, one or more communication interfaces 25 for coupling to an in-data center 3400 or inter-data center network 3403, the virtual network gateway apparatus 2, or the network apparatus 11, a display unit 23, an input unit 24, and a data bus 26 for coupling these.

The storage unit 22 is a volatile storage device such as a semiconductor memory (RAM (random access memory)), a readable and writable non-volatile storage device such as a hard disk or an SSD (solid state drive), a read only non-volatile storage device such as a magneto-optical media, or the like.

In the devices 20, computation processes associated with execution of software, for example, are executed by the control unit 21.

The display unit 23 can be comprised of a CRT display, a liquid crystal display, or the like, and the input unit 24 can be comprised of a keyboard, mouse, or the like.

Programs to be executed by the control unit 21 and data to be used by the programs may be stored in the storage unit 22 or may be introduced from another device through the communication interface 25.

Also, the devices 20 can have a configuration in which the display unit 23 and the input unit 24 are omitted.

Figure 4:
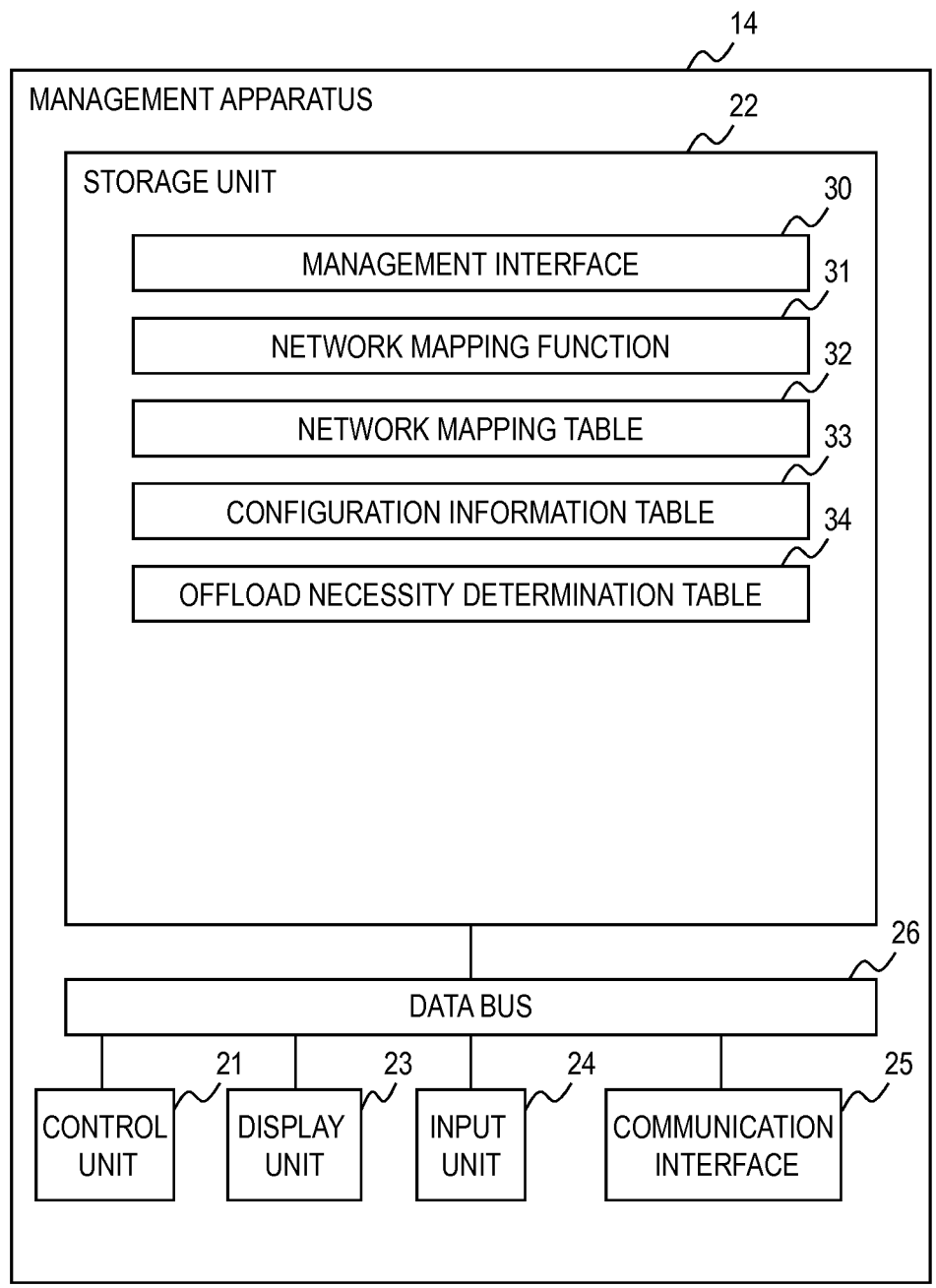
FIG. 4 is a block diagram for illustrating an example of a management apparatus according to the first embodiment of this invention.

FIG. 4 is a block diagram showing one example of a configuration of the management apparatus 14. The hardware configuration is similar to that of FIG. 3.

A management interface 30 is an interface that receives requests from the terminal 12 operated by a user, the portal 13, or other hardware or software to add/delete virtual networks 16, couple/decouple the virtual machine 6 to/from the virtual network 16, change whether or not hardware offloading of the virtual network 16 is necessary, or the like.

The management interface 30 can be realized by a well-known technique such as an application programming interface (API) such as Representational State Transfer (REST), a command line interface (CLI) such as Telecommunication Network (TELNET) or Secure Shell (SSH), or a graphical user interface (GUI).

A network mapping function 31 is a program that associates the virtual network 16 with VLAN identifiers of individual VLAN domains 8 and intermediate IF identifiers of the virtual network gateway apparatuses 2, and virtual network identifiers of the individual virtual network gateway apparatuses 2 with each other, and issues as a command the results of associating the virtual network gateway apparatus 2 and the virtualization base management apparatus 15.

A network mapping table 32 stores information indicating relationships of the virtual network 16 with VLAN identifiers of individual VLAN domains 8 and intermediate IF identifiers of the virtual network gateway apparatuses 2, and virtual network identifiers of the individual virtual network gateway apparatuses 2 with each other.

A configuration information table 33 stores information indicating connective relations between the virtual network gateway apparatus 2, the port 3, the host computer 4, the virtual switch 40, the virtual port 5, and the virtual machine 6.

An offload necessity determination table 34 stores user requests indicating the necessity for offloading switching processes for transmission between virtual machines 6 to the virtual network gateway apparatus 2 instead of the virtual switch 40.

The network mapping function 31 is loaded in the memory storage unit 22 as a program. The control unit 21 operates as a functional unit that provides prescribed functions by executing processes according to programs in respective functional units. The control unit 21 functions as the network mapping function 31 by performing processes according to the network mapping program, for example. The same applies for other programs. Additionally, the control unit 21 also operates as functional units providing, respectively, functions of a plurality of processes executed by respective programs. The computer and the computer system are a device and system including these functional units.

Programs, data, tables, and the like realizing respective functions of the network mapping function 31 can be stored in a storage device such as a storage system, a non-volatile semiconductor memory, a hard disk drive, or a solid state drive (SSD), or in a computer-readable non-transitory data storage medium such as an IC card, an SD card, or a DVD.

FIG. 5 shows an example of a network mapping table 32.

A virtual network ID 320 is information allowing the user of the terminal 12 to uniquely identify the virtual network 16, and is unique information among the plurality of virtual network gateway apparatuses 2 in a network virtualization system. The management apparatus 14 sets a VNI (VXLAN network identifier) as the virtual network ID 320 if the virtual network 16 is a VXLAN, for example.

The gateway ID 321 is information for uniquely identifying the virtual network gateway apparatus 2.

A local virtual network ID 322 is information for uniquely identifying a virtual network 16 in individual virtual network gateway apparatuses 2. The local virtual network ID 322 is set to VNI if the virtual network 16 is a VXLAN, for example. In the present embodiment, by providing a local virtual network ID 322, unique virtual network identifying information in individual virtual network gateway apparatuses 2 can be converted to unique identifying information among the virtual network gateway apparatuses 2, but the present patent is not limited to this configuration. A configuration may be adopted in which the local virtual network ID 322 is absent or the local virtual network ID 322 and the identifying information for the virtual network 16 are the same.

An intermediate interface ID 323 is information for uniquely identifying an intermediate interface 70 for coupling the virtual network 16 to the VLAN 9 in the virtual network gateway apparatus 2 or the virtual network 16 to the VLAN 9 through the local virtual network 7.

The VLAN domain ID 324 is information for uniquely identifying the VLAN domain 8.

The VLAN ID 325 is information for uniquely identifying the VLAN 9 in the VLAN domain 8.

The port ID 326 is information for uniquely identifying the port 3 that transmits/receives VLAN transmissions.

FIG. 6 shows an example of the configuration information table 33.

The gateway ID 330 is information for uniquely identifying the virtual network gateway apparatus 2.

The VLAN domain ID 331 is information for uniquely identifying the VLAN domain 8.

The VLAN ID 332 is information for uniquely identifying the VLAN 9 in the VLAN domain 8.

The port ID 333 is information for uniquely identifying the port 3 that transmits/receives VLAN transmissions.

The host ID 334 is information for uniquely identifying the host computer 4. The virtual switch ID 335 is information for uniquely identifying the virtual switch 40.

The virtual port ID 336 is information for uniquely identifying the virtual port 5. The virtual machine ID 337 is information for uniquely identifying the virtual machine 6.

FIG. 7 shows an example of the offload necessity determination table 34.

The user ID 60 is information for uniquely identifying the user. The virtual network ID 61 is information allowing the terminal 12 of a user to uniquely identify the virtual network 16. The virtual network ID 61 is set to VNI if the virtual network 16 is a VXLAN, for example.

An offload necessity score 62 is information for identifying whether or not the switching process between virtual machines 6 should be offloaded to from the virtual switch 40 to the virtual network gateway apparatus 2 in the virtual network 16 indicated by the virtual network ID 61.

The offload necessity score 62 is set to "necessary" if the switching process is to be performed by the virtual network gateway apparatus 2, and the switching process is offloaded from the virtual switch 40. The offload necessity score 62 is set to "not necessary" if the switching process is to be performed by the virtual switch 40 such that the virtual switch 40 itself executes the switching process, consuming physical computer resources of the host computer 4.

As will be described later, if the offload necessity score 62 is set to "necessary," then the management apparatus 14 issues a command through the virtualization base management apparatus 15 such that the virtual switch 40 allocates a different VLAN 9 to the virtual port 5 under this virtual switch 40. In this manner, transmissions from the virtual machine 6 coupled to the virtual switch 40 are forwarded through a different VLAN 9 to the intermediate IF 70 of the virtual network gateway apparatus 2, after which a switching process is performed. As a result, the load of the switching process is reduced in the virtual switch 40, and it is possible to ensure processing performance in the host computer 4.

Figure 8:
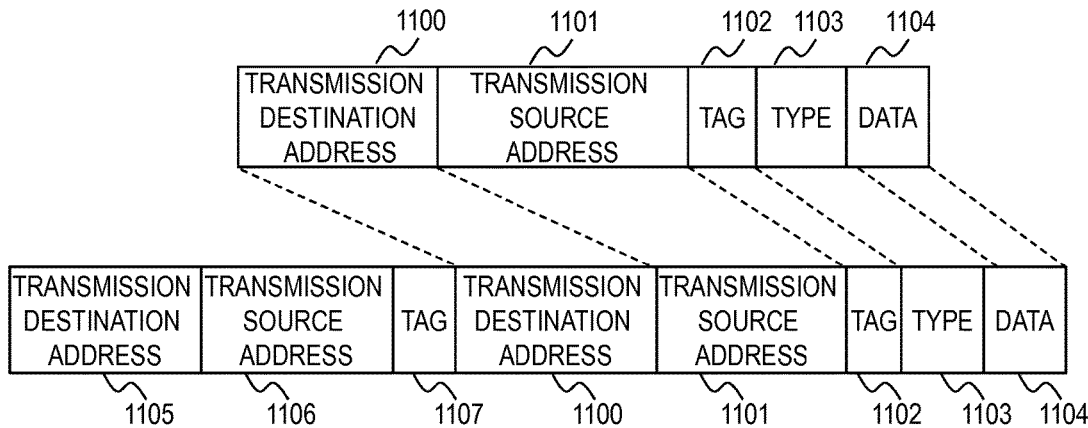
FIG. 8 is a diagram for illustrating a data structure of a virtual network transmission according to the first embodiment of this invention.

FIG. 8 shows an example of a data structure of a virtual network transmission. In this drawing, an example is shown of a transmission data (packet) structure prior to virtualization by the network virtualization function of the virtual network gateway apparatus 2, and the transmission data structure after virtualization.

In FIG. 8, the transmission prior to virtualization is shown as a general Ethernet transmission frame, and an example is shown in which the transmission frame is encapsulated by an IP transmission packet by the network virtualization function, but the present invention is not limited to such a transmission frame structure or a network virtualization protocol.

For example, network virtualization may be realized by tagging or the like, and a proprietary transmission frame may be used.

The transmission destination address 1100 is a field in which network identification information for uniquely identifying the transmission destination on the network is stored.

The transmission source address 1101 is a field in which network identification information for uniquely identifying the transmission source on the network is stored.

The tag 1102 is a field for storing identification information for classifying transmissions, and is a field for a VLAN identifier or the like, for example.

The type 1103 is a field for storing protocol type information, and is a field for a protocol number such as TCP or UDP (user datagram protocol), for example. The data 1104 is a field for storing desired data to be forwarded to the destination of transmission.

The network virtualization function adds the fields 1104 to 1107 in the drawing as headers to the fields 1100 to 1104 in the drawing.

The transmission destination address 1105 is a field in which network identification information for uniquely identifying the transmission destination on the network, after encapsulation by the network virtualization function, is stored.

The transmission source address 1106 is a field in which network identification information for uniquely identifying the transmission source on the network, after encapsulation by the network virtualization function, is stored.

The tag 1107 is information for uniquely identifying the local virtual network 7, and is VNI in a VXLAN, for example.

In the virtual network 16, it is possible to identify the transmission destination and source by the fields 1105 to 1107 added as headers for network virtualization. Also, it is possible to delete the network virtualization header for transmission in the host computer 4.

Figure 9:
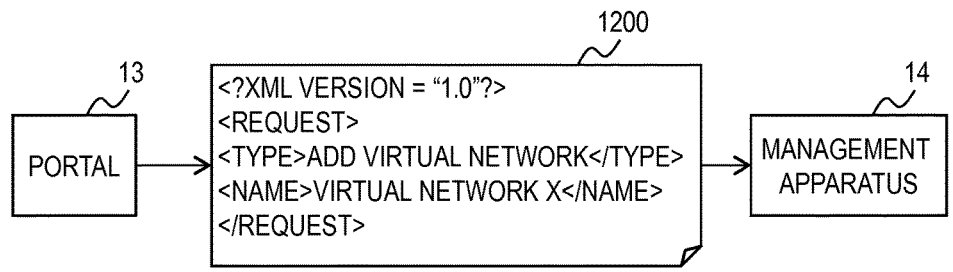
FIG. 9 is a diagram for illustrating a data structure of a request to add the virtual network according to the first embodiment of this invention.

FIG. 9 shows an example of a data structure of a request to add a virtual network transmission. The drawing shows an example of request data that a user operating the terminal 12 sends through the portal 13 to the management apparatus 14 in order to make a request to add or delete a virtual network, to couple or decouple the virtual machine to/from the virtual network, to change the necessity or lack thereof for hardware offloading of the virtual network, or the like.

The message 1200 is request data to be sent by the portal 13 to the management apparatus 14.

FIG. 9 shows an example in which the portal 13 sends a request to the management apparatus 14 to add the virtual network.

The message 1200 is transmitted through a CLI, GUI, API, or the like. The transmission protocol may be of a publicly known protocol such as TELNET, SSH, or HTTP (hypertext transfer protocol), or may be proprietary.

Also, the format of the message 1200 may be of a publicly known format such as XML (extensible markup language), or may be proprietary.

In the example in the drawing, XML is used, but the present invention is not limited to any protocol or format.

Figure 10:
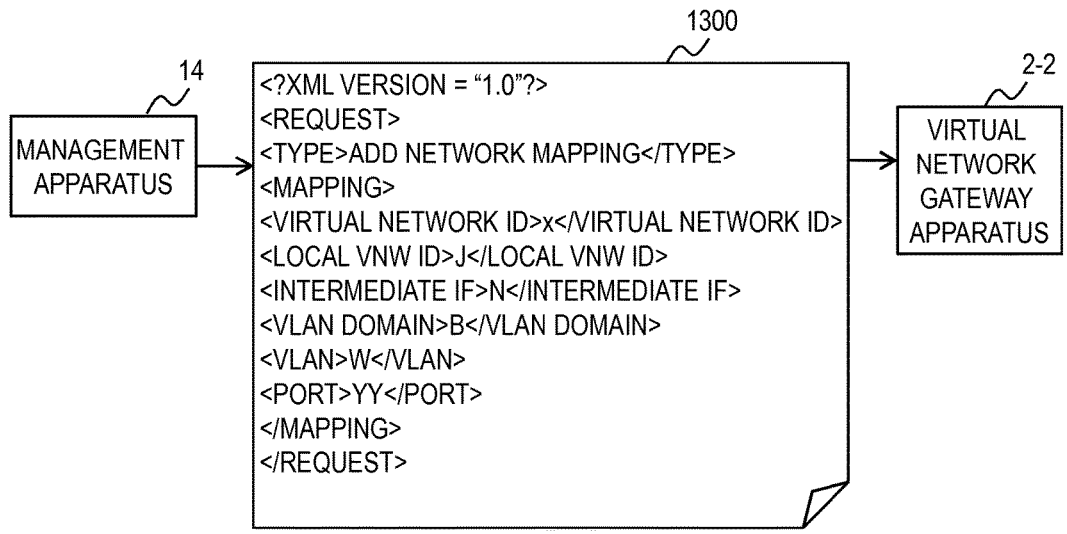
FIG. 10 is a diagram for illustrating a data structure for issuing a command for network mapping according to the first embodiment of this invention.

FIG. 10 shows an example of a data structure for issuing a command for network mapping. In FIG. 10, an example is shown of command data for when the management apparatus 14 issues a command to the virtual network gateway apparatus 2 to put the virtual network 16, intermediate IF 70, and VLAN 9 in association with each other.

The message 1300 is command data sent by the management apparatus 14 to the virtual network gateway apparatus 2.

In FIG. 10, an example is shown of command data for when the management apparatus 14 issues a command to the virtual network gateway apparatus 2-2 to add the correspondence between the virtual network 16, intermediate IF 70, and VLAN 9.

The message 1300 is transmitted through a CLI, GUI, API, or the like. The transmission protocol may be of a publicly known protocol such as TELNET, SSH, or HTTP, or may be proprietary. The format of the message 1300 may be of a publicly known format such as XML, or may be proprietary.

In the example in the drawing, XML is used, but the present invention is not limited to any protocol or format.

Figure 11:
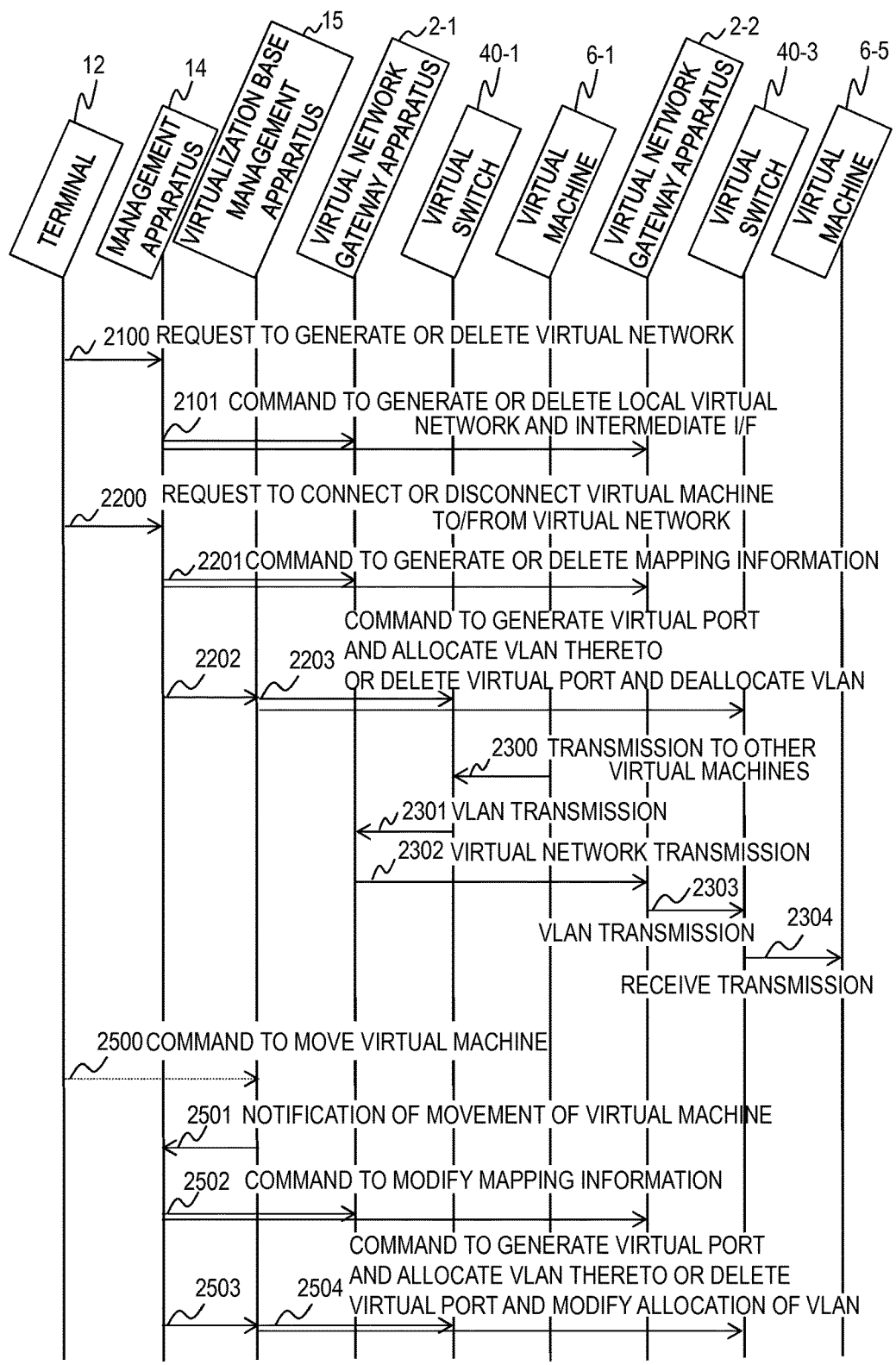
FIG. 11 is a diagram for illustrating an example of a sequence according to the first embodiment of this invention.

FIG. 11 is a sequence drawing showing an example of a process performed by the network virtualization system. In FIG. 11, an example is shown in which the terminal 12 operated by the user, through the management apparatus 14, adds or deletes the virtual network 16, couples or decouples the virtual machine 6 to/from the virtual network 16, and migrates the virtual machine 6 through the virtualization base management apparatus 15.

The drawing, for ease of description, shows a process sequence performed in the network virtualization system as a whole with two groups including virtual network gateway apparatuses 2-1 and 2-2, virtual switches 40-1 and 40-3, and virtual machines 6-1 and 6-5.

Specifically, the first group includes the virtual network gateway apparatus 2-1, the virtual switch 40-1 coupled to the virtual network gateway apparatus 2-1, and the virtual machine 6-1 coupled to the virtual switch 40-1.

The second group includes the virtual network gateway apparatus 2-2, the virtual switch 40-3 coupled to the virtual network gateway apparatus 2-2, and the virtual machine 6-5 coupled to the virtual switch 40-3.

In step 2100, the terminal 12 operated by the user issues a request to the management apparatus 14 to add or delete the virtual network 16.

In step 2101, the management apparatus 14 issues a command to the virtual network gateway apparatuses 2-1 and 2-2 to generate or delete the local virtual network 7 and the intermediate IF 70 corresponding to the virtual network 16.

In step 2200, the terminal 12 operated by the user issues a request to couple or decouple the virtual machine 6 to/from the virtual network 16.

In step 2201, the management apparatus 14 issues a command to the virtual network gateway apparatuses 2-1 and 2-2 to select or deselect the VLAN 9 to be associated with the virtual network 16, and to couple or decouple the virtual network 16, the local virtual network 7, the intermediate IF 70, and the VLAN 9 for the respective virtual network gateway apparatuses 2-1 and 2-2.

In step 2202 management apparatus 14 issues a command to the virtualization base management apparatus 15 to select or deselect the VLAN 9 and virtual port 5 to associate with the virtual network 16, and to couple or decouple the virtual machine 6 to/from the virtual port 5.

In step 2203, the virtualization base management apparatus 15 executes the command received from the management apparatus 14 in step 2202.

In step 2300, the virtual machine 6-1 sends a transmission packet to the virtual machine 6-5 coupled to the same virtual network 16.

In step 2301, the virtual switch 40-1 receives the transmission packet and, on the basis of the command from the virtualization base management apparatus 15 in step 2203, assigns a VLAN identifier to the transmission packet and forwards it to the virtual network gateway apparatus 2-1.

In step 2302, the virtual network gateway apparatus 2-1 converts the transmission packet to a virtual network transmission and forwards it to the virtual network gateway apparatus 2-2 on the basis of mapping information of the virtual network 16, the local virtual network 7, the intermediate IF 70, the VLAN domain 8, the VLAN 9, and the port 3 according to the command in step 2201.

In step 2303, the virtual network gateway apparatus 2-2 converts the transmission packet to a VLAN transmission and forwards it to the virtual switch 40-3 on the basis of mapping information of the virtual network 16, the local virtual network 7, the intermediate IF 70, the VLAN domain 8, the VLAN 9, and the port 3 according to the command in step 2201.

In step 2304, the virtual switch 40-3 receives the transmission packet and, on the basis of the command from the virtualization base management apparatus 15 in step 2203, determines the destination virtual port 5 using the VLAN identifier and forwards the transmission packet to the virtual machine 6-5.

Next, the migration of the virtual machine 6 will be described. In step 2500, the terminal 12 operated by the user issues a command to the virtualization base management apparatus 15 to migrate the virtual machine 6 through the portal 13 and the management apparatus 14.

The migration of the virtual machine 6 need not necessarily occur on the basis of a command from the terminal 12 operated by the user and may be performed autonomously by the virtualization base management apparatus 15, according to a command from the management apparatus 14, or according to a command from other software or hardware.

In step 2501, the virtualization base management apparatus 15 notifies the management apparatus 14 of the migration of the virtual machine 6.

In step 2502, the management apparatus 14 issues a command to the virtual network gateway apparatuses 2-1 and 2-2 to modify the mapping information of the local virtual network 7, the intermediate IF 70, the VLAN domain 8, the VLAN 9, and the port 3 in conjunction with the migration of the virtual machine 6.

In step 2503, the management apparatus 14 issues a command to the virtualization base management apparatus 15 to modify the allocation of the virtual port 5 and the VLAN 9 to the virtual machine 6, in conjunction with the migration of the virtual machine 6.

In step 2504, the virtualization base management apparatus 15 transmits the command received from the management apparatus 14 in step 2503 to the host computer 4-1 and the hypervisor 41-1 and causes the command to be executed therein.

By the process above, even if the virtual machine 6 is migrated to another VLAN domain 8, it is possible to allocate the virtual network 16 at the source from which the virtual machine 6 was migrated and to perform transmission using the VLAN 9 in a manner similar to before migration.

Figure 16:
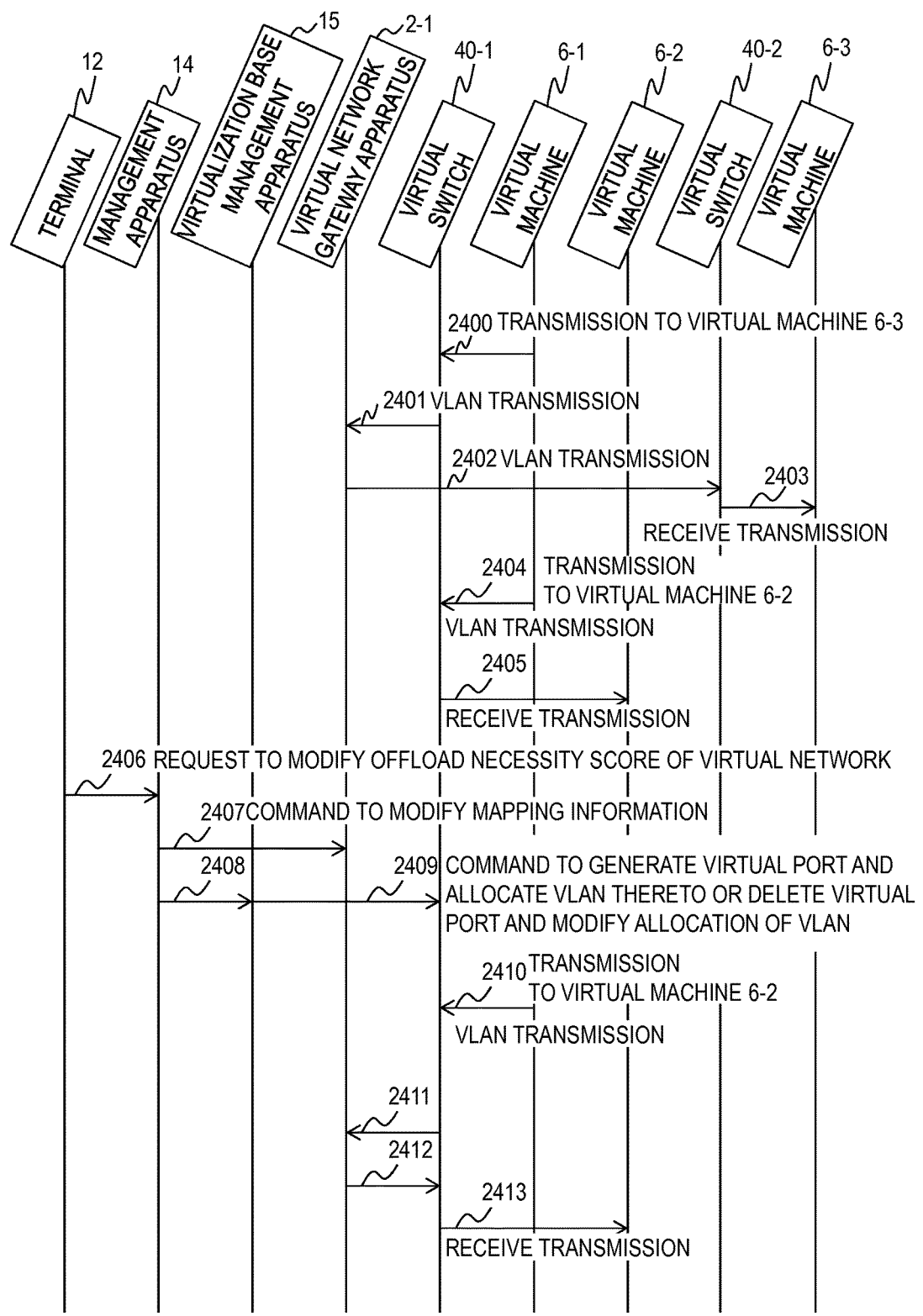
FIG. 16 is a diagram for showing an example of a sequence in which the terminal operated by the user modifies the offload necessity score of the virtual network according to the first embodiment of this invention.

FIG. 16 shows an example of a sequence in which the terminal 12 operated by the user modifies the offload necessity score of the virtual network 16 through the management apparatus 14.

Steps 2401 to 2403 show transmission between the virtual machine 6-1 and the virtual machine 6-3. The virtual machine 6-1 and the virtual machine 6-3 are present in different host computers 4-1 and 4-2 through different ports 3-1 and 3-2, and thus, even if the VLAN 9-1 allocated to the virtual port 5-1 to which the virtual machine 6-1 is coupled were the same as the VLAN 9-3 allocated to the virtual port group 5-3 to which the virtual machine 6-3 is coupled, transmissions between the virtual machine 6-1 and the virtual machine 6-3 would be performed through the virtual network gateway apparatus 2.

In step 2400, for example, the virtual machine 6-1 transmits a transmission packet to the virtual machine 6-3.

In step 2401, the virtual switch 40-1 allocates the VLAN 9-1 for the transmission and forwards the transmission to the virtual network gateway apparatus 2-1.

In step 2402, the virtual network gateway apparatus 2-1 forwards the transmission to the port 3-2 if the VLAN 9-1 and the VLAN 9-3 are the same.

In step 2403, the virtual switch 40-2 forwards the transmission to the virtual port group 5-3 to which the VLAN 9-3 was associated, and the virtual machine 6-3 receives the transmission.

Steps 2404 to 2405 show transmission between the virtual machine 6-1 and the virtual machine 6-2. The virtual machine 6-1 and the virtual machine 6-2 are coupled to the same virtual switch 40-1 on the same host computer 4-1, and thus, if the VLAN 9-1 allocated to the virtual port 5-1 to which the virtual machine 6-1 is coupled is the same as the VLAN 9-3 allocated to the virtual port 5-2 to which the virtual machine 6-2 is coupled, then transmissions between the virtual machine 6-1 and the virtual machine 6-2 would be performed through the virtual switch 40-1.

In step 2404, for example, the virtual machine 6-1 transmits a transmission packet to the virtual machine 6-2.

In step 2405, if the VLAN 9-1 allocated to the virtual port 5-1 to which the virtual machine 6-1 is coupled is the same as the VLAN 9-3 allocated to the virtual port 5-2 to which the virtual machine 6-2 is coupled, then the virtual switch 40-1 forwards the transmission to the virtual port 5-2 and the virtual machine 6-2 receives the transmission.

After step 2406, the terminal 12 operated by the user modifies the hardware offload score for transmission between the virtual machine 6-1 and the virtual machine 6-2 to "necessary," through the management apparatus 14. In this manner, the transmission forwarded by the virtual switch 40-1 as shown in steps 2404 to 2405 is similarly forwarded through the virtual network gateway apparatus 2-1 in steps 2400 to 2403.

In step 2406, the terminal 12 operated by the user transmits to the management apparatus 14 a request to modify the offload necessity score for a process for the virtual network 16 to switch to the virtual network gateway apparatus 2-1.

In step 2407, the management apparatus 14 issues a command to the virtual network gateway apparatus 2-1 to modify the mapping information of the local virtual network 7, the intermediate IF 70, the VLAN domain 8, the VLAN 9, and the port 3 in conjunction with the modification of the offload necessity score 62. Specifically, in this sequence, the local virtual network 7-1, the VLAN 9-1, and the VLAN 9-3 are mapped to the same intermediate IF 70-1.

In step 2408, the management apparatus 14 issues a command to the virtualization base management apparatus 15 to modify the allocation of the virtual ports 5-1 and 5-2 and the VLANs 9-1 and 9-2 to the virtual machines 6-1 and 6-2, in conjunction with the modification of the offload necessity score 62.

In step 2409, the virtualization base management apparatus 15 causes the command received from the management apparatus 14 in step 2402 to be executed in the hypervisor 41-1. The hypervisor 41-1 modifies the allocation of the virtual ports 5-1 and 5-2 and the VLANs 9-1 and 9-2 to the virtual machines 6-1 and 6-2.

In step 2410, the virtual machine 6-1 transmits a transmission packet to the virtual machine 6-2.

In step 2411, the virtual switch 40-1 is changed such that the VLAN 9-1 allocated to the virtual port 5-1 to which the virtual machine 6-1 is coupled and the VLAN 9-3 allocated to the virtual port 5-2 to which the virtual machine 6-2 is coupled are different from each other, and thus, the transmission is forwarded to the virtual network gateway apparatus 2-1.

In step 2412, the virtual network gateway apparatus 2-1 forwards the transmission to the port 3-1 to which the VLAN 9-3 has been allocated because the VLAN 9-1 and the VLAN 9-3 have been mapped to the same intermediate IF 70-1.

In step 2413, the virtual switch 40-1 forwards the transmission received from the port 3-1 to the virtual port 5-2 to which the VLAN 9-3 was associated, and the virtual machine 6-2 receives the transmission.

In this manner, the switching functions of the virtual switch 40-1 are offloaded to the virtual network gateway apparatus 2-1, and the host computer 4-1 can reduce the load required for processes performed by the virtual switch 40-1.

Figure 12:
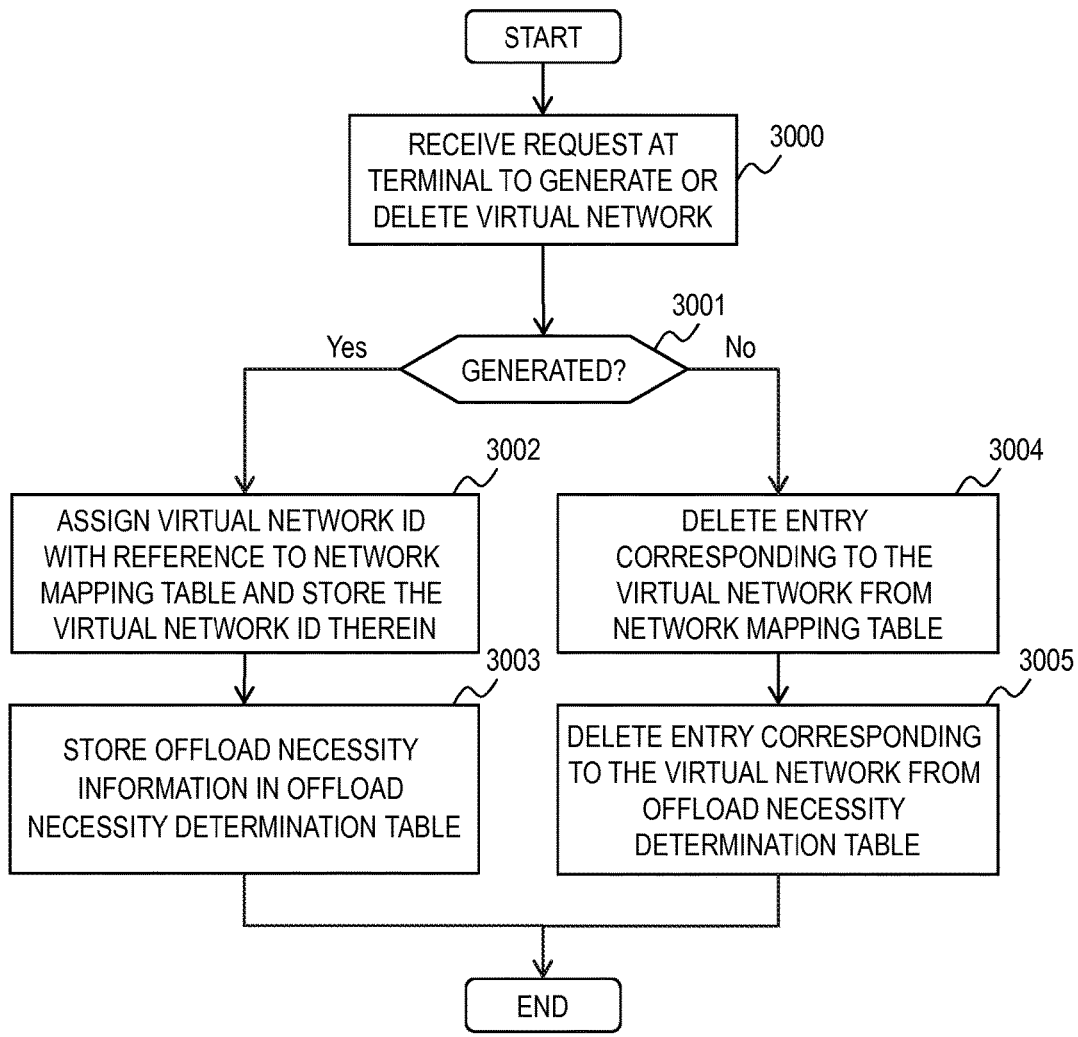
FIG. 12 is a flowchart for showing an example of a process to generate or delete the virtual network according to the first embodiment of this invention.

FIG. 12 is a flowchart showing one example of a process to generate or delete the virtual network 16.

In step 3000, the network mapping function 31 of the management apparatus 14 receives through the management interface 30 a request to generate or delete the virtual network 16 directly from the terminal 12 operated by the user or through software or hardware such as the portal 13.

In step 3001, if the request is to generate the virtual network 16, then the process progresses to step 3002, and if the request is to delete the virtual network 16, then the process progresses to step 3004.

In step 3002, the network mapping function 31 selects the unallocated virtual network ID 320 with reference to the network mapping table 32, and stores the virtual network ID 320 in the network mapping table 32.

In step 3003, the network mapping function 31 stores hardware offload necessity information according to the request in the offload necessity determination table 34.

If, in step 3004, deletion is selected, the network mapping function 31 deletes an entry corresponding to the virtual network 16 from the network mapping table 32.

In step 3005, the network mapping function 31 deletes an entry corresponding to the virtual network 16 from the offload necessity determination table 34.

By the process above, the management apparatus 14 can control whether or not functions of the virtual switch 40 are offloaded to the virtual network gateway apparatus 2.

Figure 13:
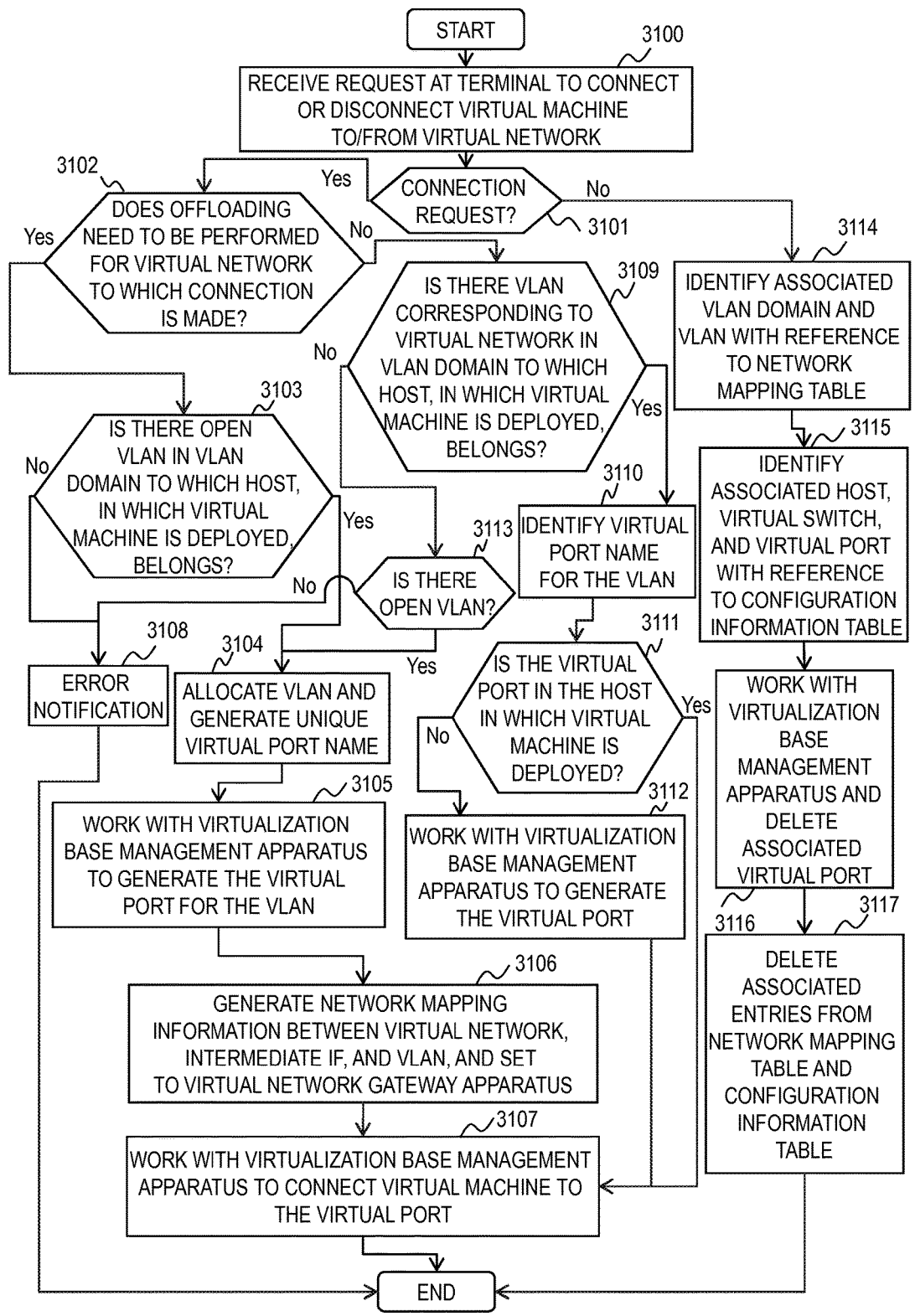
FIG. 13 is a flowchart for showing an example of a process to connect or disconnect the virtual machine to/from the virtual network according to the first embodiment of this invention.

FIG. 13 is a flowchart showing one example of a process to couple or decouple the virtual machine 6 to/from the virtual network 16.

In step 3100, the network mapping function 31 of the management apparatus 14 receives through the management interface 30 a request to couple or decouple the virtual machine 6 to/from the virtual network 16 directly from the terminal 12 operated by the user or through software or hardware such as the portal 13.

In step 3101, the network mapping function 31 proceeds to step 3102 if the request received is to couple the virtual machine 6 to the virtual network 16, and if the request is to decouple the virtual machine 6 from the virtual network 16, then the network mapping function 31 proceeds to step 3114.

In step 3102, the network mapping function 31 determines the offload necessity score 62 of the virtual network 16 with reference to the offload necessity determination table 34. If offloading is necessary, then the process proceeds to step 3103, and if offloading is not necessary, then the process proceeds to step 3109.

In step 3103, the network mapping function 31 determines whether or not there are any unallocated VLANs 9 in the VLAN domain 8 to which the host computer 4, to which the virtual machine 6 is to be deployed, belongs, with reference to the configuration information table 33. If there is an unallocated VLAN 9, then the process proceeds to step 3104, and if not, then the process proceeds to step 3108.

In step 3104, the network mapping function 31 allocates the as-yet-unallocated VLAN 9, and generates a unique virtual port number in the VLAN domain 8.

In step 3105, the network mapping function 31 works with the virtualization base management apparatus 15 to generate a virtual port 5 in the virtual switch 40 of the host computer 4 to which the virtual machine 6 is to be deployed, using the virtual port name generated in step 3104, and adds an entry to the configuration information table.

In step 3106, the network mapping function 31 identifies the virtual network gateway apparatus 2 to which the host computer 4, to which the virtual machine 6 is to be deployed, is coupled, with reference to the configuration information table 33. Then, the network mapping function 31 determines the presence or absence of the local virtual network 7 and intermediate IF 70 corresponding to the virtual network 16 to which the coupling is to be made, with reference to the network mapping table 32.

If there is a local virtual network 7 and an intermediate IF 70, then the VLAN 9 determined in step 3104 is associated with the intermediate IF 70, and if not, then an intermediate IF ID is generated, the VLAN 9 determined in step 3104 is put in association with the intermediate IF 70, and an entry is added to the network mapping table 32.

The network mapping function 31 issues a command to the identified virtual network gateway apparatus 2 to couple the local virtual network 7, the intermediate IF 70, and the VLAN 9 with the contents of the entry added to the network mapping table 32.

In step 3107, the network mapping function 31 works with the virtualization base management apparatus 15 to couple the virtual machine 6 to the virtual port 5 generated in step 3105.

On the other hand, in step 3108, there is no unallocated VLAN 9, and thus, the network mapping function 31 returns an error and the process is terminated.

In step 3109 in which hardware offloading is determined to be unnecessary, the network mapping function 31 identifies the VLAN domain 8 to which the host computer 4, to which the virtual machine 6 is to be deployed, belongs, with reference to the configuration information table 33. The network mapping function 31 determines the presence or absence of the VLAN 9 associated with the virtual network 16 to which a coupling is to be made in the VLAN domain 8 with reference to the network mapping table 32, on the basis of the VLAN domain 8. If there is a VLAN 9, then the process proceeds to step 3110, and if not, then the process proceeds to step 3113.

In step 3110, the network mapping function 31 identifies the virtual port name associated with the VLAN 9 with reference to the configuration information table 33.

In step 3111, the network mapping function 31 determines the presence or absence of the virtual port 5 in the host computer 4 to which the virtual machine 6 is to be deployed, with reference to the configuration information table 33. If there is a virtual port 5, then the process proceeds to step 3107, and if not, then the process proceeds to step 3112.

In step 3112, the network mapping function 31 works with the virtualization base management apparatus 15 to generate a virtual port 5 in the virtual switch 40 of the host computer 4 to which the virtual machine 6 is to be deployed, using the virtual port name identified in step 3110. The virtualization base management apparatus 15 assigns the virtual port name to the generated virtual port 5. Then, the process proceeds to step 3107 and the virtual machine 6 is coupled to the virtual port 5.

On the other hand, during the determination of step 3109, in the step 3113 in which it is determined that there is no VLAN 9 associated with the virtual network 16 to which a coupling is to be made, the network mapping function 31 determines the presence or absence of an unallocated VLAN 9 in the VLAN domain to which the host computer 4, to which the virtual machine 6 is deployed, belongs, with reference to the configuration information table 33. If there is an unallocated VLAN 9, then the process proceeds to step 3114, and if not, then the process proceeds to step 3108, and the error is issued as a notification.

Also, during the determination of step 3101, in step 3114 in which the received request is to decouple from the virtual network 16, the network mapping function 31 identifies the VLAN domain 8 and the VLAN 9 corresponding to the virtual network 16, with reference to the network mapping table 32.

In step 3115, the network mapping function 31 identifies the host computer 4, the virtual switch 40, and the virtual port 5 corresponding to the VLAN domain 8 and the VLAN 9, with reference to the configuration information table 33.

In step 3116, the network mapping function 31 works with the virtualization base management apparatus 15 to delete the identified virtual port 5.

In step 3117, the network mapping function 31 deletes the corresponding entry from the network mapping table 32 and the configuration information table 33, and terminates the process.

By the process above, the virtual machine 6 is coupled to the virtual network 16 or decoupled therefrom according to a command from the terminal 12 operated by the user.

Figure 14:
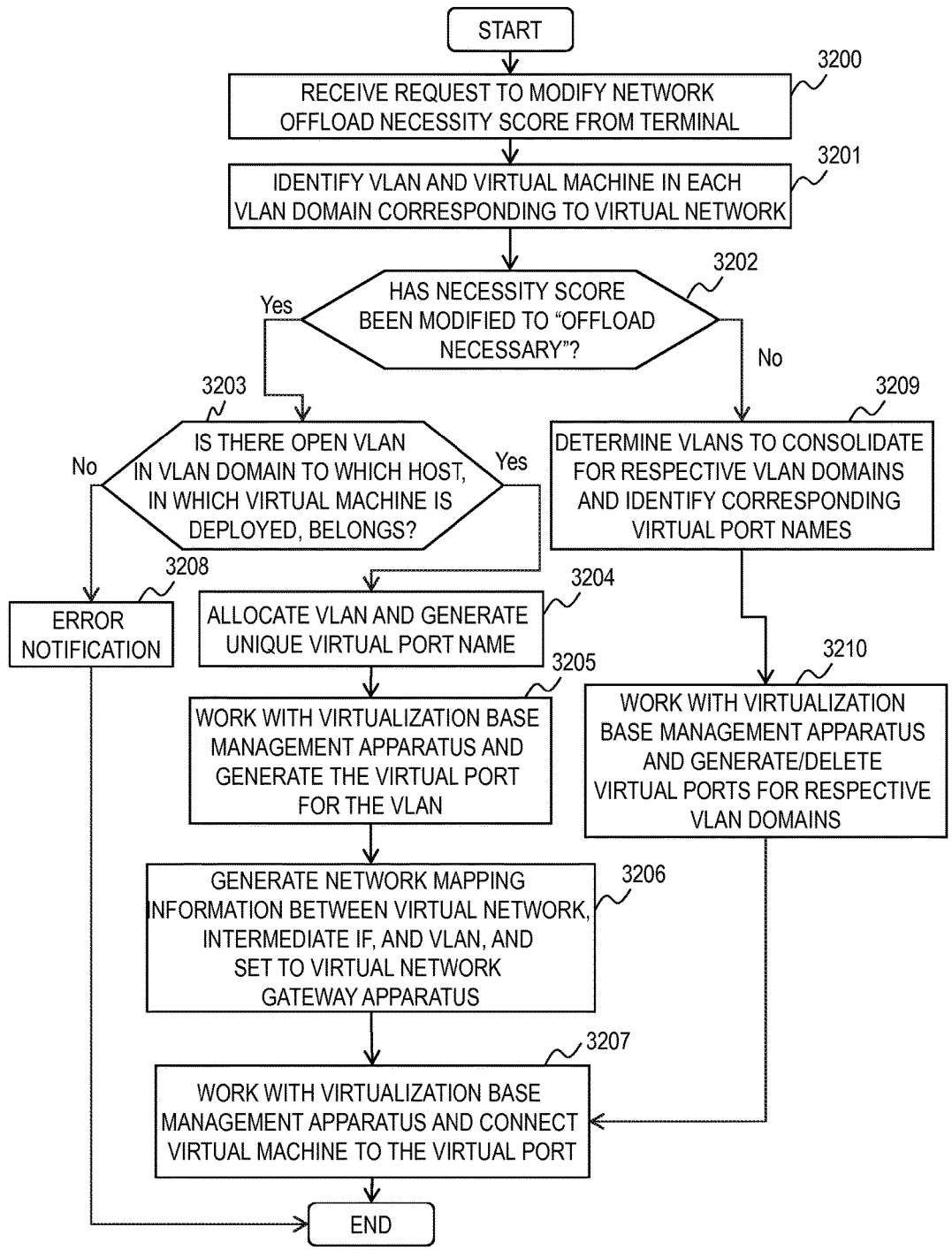
FIG. 14 is a flowchart for showing an example of a process to modify the hardware offloads necessity score of the virtual network according to the first embodiment of this invention.

FIG. 14 is a flowchart showing one example of a process to modify the hardware offload necessity score 62 of the virtual network 16.

In step 3200, the network mapping function 31 of the management apparatus 14 receives through the management interface 30 a request to modify the hardware offload necessity score 62 of the virtual network 16 directly from the terminal 12 operated by the user or through software or hardware such as the portal 13.

In step 3201, the network mapping function 31 identifies the VLAN domain 8 corresponding to the virtual network 16 and the virtual machine 6 coupled to the VLAN 9 and the virtual network 16, with reference to the network mapping table 32 and the configuration information table 33.

In step 3202, if the request is to modify the offload necessity score to "necessary," then the process proceeds to step 3203, and if the request is to modify the offload necessity score to "unnecessary," then the process proceeds to step 3209.

In step 3203, the network mapping function 31 determines whether or not there are any unallocated VLANs 9 that can be allocated to all identified virtual machines 6 in the VLAN domain 8 to which the host computer 4, to which the identified virtual machines 6 are to be deployed, belongs, with reference to the configuration information table 33. If there is an unallocated VLAN 9, then the process proceeds to step 3204, and if not, then the process proceeds to step 3208.

In step 3204, the network mapping function 31 allocates the VLAN 9 to the identified virtual machine 6, and generates a unique virtual port number.

In step 3205, the network mapping function 31 works with the virtualization base management apparatus 15 to generate a virtual port 5 in the virtual switch 40 of the host computer 4 to which the virtual machine 6 is to be deployed, using the virtual port name generated in step 3204, and adds an entry to the configuration information table.

In step 3206, the network mapping function 31 identifies the virtual network gateway apparatus 2 to which the host computer 4, to which the virtual machine 6 is to be deployed, belongs, with reference to the configuration information table 33, and furthermore, determines the presence or absence of a local virtual network 7 and intermediate IF 70 corresponding to the virtual network 16 to which the coupling is to be made, with reference to the network mapping table 32.

If there is a local virtual network 7 and an intermediate IF 70 corresponding to the virtual network 16 to which the coupling is to be made, then the network mapping function 31 associates the VLAN 9 determined in step 3204 with the intermediate IF 70, and if not, then the network mapping function 31 generates an intermediate IF ID, puts the VLAN 9 determined in step 3204 in association with the intermediate IF 70, and adds an entry to the network mapping table 32. The network mapping function 31 issues a command to the virtual network gateway apparatus 2 to couple the local virtual network 7, the intermediate IF 70, and the VLAN 9 with the information of the added entry.

In step 3207, the network mapping function 31 works with the virtualization base management apparatus 15 to couple the virtual machine 6 to the virtual port 5 generated in step 3205.

On the other hand, in step 3203, if there is no unallocated VLAN 9, the network mapping function 31 returns an error and terminates the process in step 3208.

Also, in step 3209 in which it was determined in step 3202 that hardware offloading is unnecessary, the network mapping function 31 selects one of the identified VLAN 9 and the associated virtual port name for each identified VLAN domain 8.

In step 3210, the network mapping function 31 determines the presence or absence of a selected virtual port 5 in the virtual switch 40 in which the virtual machine 6 identified in step 3201 operates, and generates a virtual port 5 if none is present. Also, the network mapping function 31 deletes all virtual ports other than the selected virtual port 5.

By the process above, it is possible to set the hardware offload necessity score 62 of the virtual network 16 and offload the switching processes of the virtual switch 40 to the virtual network gateway apparatus 2 or cancel offloading according to a command from the terminal 12.

Figure 15:
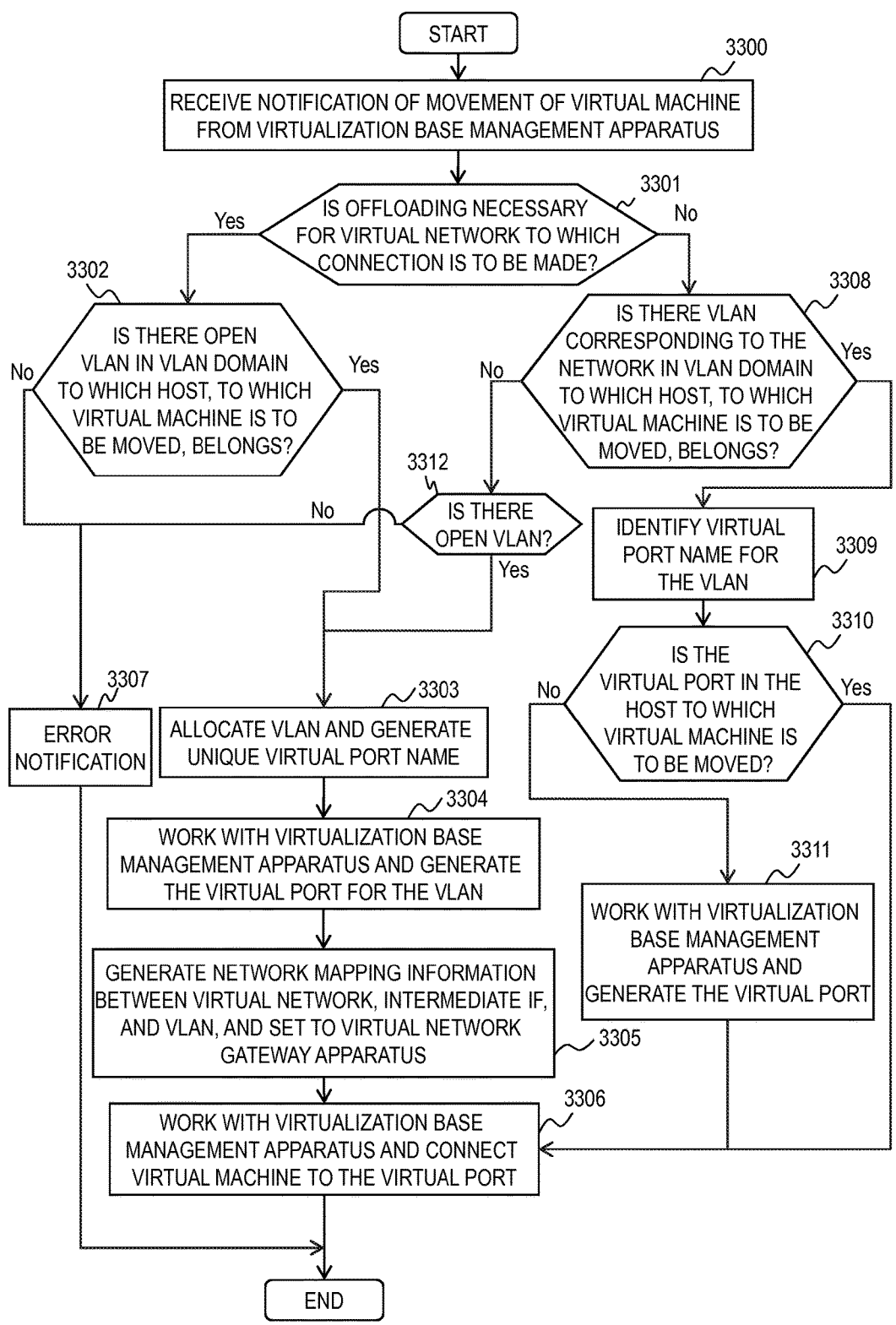
FIG. 15 is a flowchart for showing an example of a process to migrate the virtual machine according to the first embodiment of this invention.

FIG. 15 is a flowchart showing one example of a process to migrate the virtual machine 6.

In step 3300, the network mapping function 31 of the management apparatus 14 receives a notification from the virtualization base management apparatus 15 that the virtual machine 6 is being migrated.

In step 3301, the network mapping function 31 determines the offload necessity score 62 of the virtual network 16 to which the virtual machine 6 is to be coupled, with reference to the offload necessity determination table 34. If offloading is necessary, then the process proceeds to step 3302, and if offloading is not necessary, then the process proceeds to step 3308.

In step 3302, the network mapping function 31 determines whether or not there are any unallocated VLANs 9 in the VLAN domain 8 to which the host computer 4, to which the virtual machine 6 is to be migrated, belongs, with reference to the configuration information table 33. If there is an unallocated VLAN 9, then the process proceeds to step 3303, and if not, then the process proceeds to step 3307.

In step 3303, the network mapping function 31 allocates the VLAN 9 to the virtual machines 6 to be migrated, and generates a unique virtual port number in the virtual network gateway apparatus 2.

In step 3304, the network mapping function 31 works with the virtualization base management apparatus 15 to generate a virtual port 5 in the virtual switch 40 of the host computer 4 to which the virtual machine 6 is to be deployed, using the virtual port name generated in step 3303, and adds an entry to the configuration information table 33.

In step 3305, the network mapping function 31 identifies the virtual network gateway apparatus 2 to which the host computer 4, to which the virtual machine 6 is to be deployed, is coupled, with reference to the configuration information table 33. Then, the network mapping function 31 determines the presence or absence of the local virtual network 7 and intermediate IF 70 corresponding to the virtual network 16 to which the coupling is to be made, with reference to the network mapping table 32 with the identified virtual network gateway apparatus 2.

If there is a local virtual network 7 and an intermediate IF 70 corresponding to the virtual network 16, then the network mapping function 31 associates the VLAN 9 determined in step 3303 with the intermediate IF 70, and if not, then the network mapping function 31 generates an intermediate IF ID, puts the VLAN 9 determined in step 3303 in association with the intermediate IF 70, and adds an entry to the network mapping table 32.

The network mapping function 31 issues a command to the virtual network gateway apparatus to couple the local virtual network 7, the intermediate IF 70, and the VLAN 9 with the information of the added entry.

In step 3306, the network mapping function 31 works with the virtualization base management apparatus 15 to couple the virtual machine 6 to the virtual port 5 generated in step 3304.

On the other hand, in step 3302, if there is no unallocated VLAN 9, the network mapping function 31 returns an error and terminates the process in step 3307.

In step 3308 in which hardware offloading is determined to be unnecessary according to the determination in step 3301, the network mapping function 31 identifies the VLAN domain 8 to which the host computer 4, to which the virtual machine 6 is to be migrated, belongs, with reference to the configuration information table 33. The network mapping function 31 determines the presence or absence of the VLAN 9 associated with the virtual network 16 to which a coupling is to be made in the identified VLAN domain 8 with reference to the network mapping table 32. If there is a VLAN 9, then the process proceeds to step 3309, and if not, then the process proceeds to step 3312.

In step 3309, the network mapping function 31 identifies the virtual port name associated with the VLAN 9 with reference to the configuration information table 33.

In step 3310, the network mapping function 31 determines the presence or absence of the virtual port 5 in the host computer 4 to which the virtual machine 6 is to be migrated, with reference to the configuration information table 33. If there is a virtual port 5, then the process proceeds to step 3306, and if not, then the process proceeds to step 3311.

In step 3311, the network mapping function 31 works with the virtualization base management apparatus 15 to generate a virtual port 5 in the virtual switch 40 of the host computer 4 to which the virtual machine 6 is to be deployed, using the virtual port name identified in step 3309. Then, the process proceeds to step 3306 and the process above is executed.

On the other hand, if it is determined in step 3308 that there are no unallocated VLANs 9, then in step 3312, the network mapping function 31 determines the presence or absence of an unallocated VLAN 9 in the VLAN domain 8 to which the host computer 4, to which the virtual machine 6 is deployed, belongs, with reference to the configuration information table 33. If there is an unallocated VLAN 9, then the process proceeds to step 3303 and the above process is executed, and if there are no unallocated VLANs 9, then the process proceeds to step 3307, an error notification is made, and the process is terminated.

By the process above, even if the virtual machine 6 is migrated to another VLAN domain 8, it is possible to allocate the virtual network 16 at the source from which the virtual machine 6 was migrated and to perform transmission using the VLAN 9 in a manner similar to before migration.

When moving the virtual machine 6, a migration request from the terminal 12 may be issued as a notification from the portal 13 and the management apparatus 14 to the virtualization base management apparatus 15, and the virtualization base management apparatus 15 may control the hypervisor 41. Also, the management apparatus 14 may determine that the virtual machine 6 should migrate and make such a request to the virtualization base management apparatus 15, and the virtualization base management apparatus 15 may request the hypervisor 41 to perform such a process.

An embodiment of the present invention has been described above. According to the present embodiment, the network virtualization system works with the management apparatus 14 and the virtualization base management apparatus 15 to allocate a different VLAN 9 to each virtual machine 6 in each individual VLAN domain 8. The management apparatus 14 then associates at least one VLAN 9 of at least one VLAN domain 8 with the local virtual network 7 through the intermediate IF 70, in the virtual network gateway apparatus 2. Then, the management apparatus 14 maps (couples) the local virtual networks 7-1 to 7-4 under the gateway (virtual network gateway apparatus 2) of the data center to the virtual networks 16-1 to 16-2, and couples the virtual networks 16-1 and 16-2 between the virtual network gateway apparatuses 2-1 and 2-2 through the communication network 1.

In this manner, a virtual network 16 coupling host computers 4 and virtual machines 6 on the host computers 4 is realized across one or more VLAN domains 8 or one or more data centers 3400.

The management apparatus 14 controls the relationship between the ID (320) of the virtual network 16 and the ID (322) of the local virtual network 7, and the ID (325) of the VLAN 9 allocated to the ID (322) of the local virtual network 7, and thus, it is possible to control computer resources allocated to the virtual network 16 across data centers 3400-1 to 3400-n.

Furthermore, in the present invention, it is possible to offload switching processes for transmissions between virtual machines 6 from the virtual switch 40 to the virtual network gateway apparatus 2 (hardware offloading). By performing switching processes for transmissions between the virtual machines 6 on the same host computer 4 in the intermediate IF 70 of the virtual network gateway apparatus 2, it is possible to reduce computer resources used in the switching process of the host computer 4-1, and thus, it is possible to ensure high performance in the host computer 4 in processing the load of the hypervisor 41.

Also, the management apparatus 14 allocates the same VLAN 9 to one or more virtual machines 6 on the same host computer 4 while working with the virtualization base management apparatus 15 according to a request from the terminal 12 operated by a user to enable modification of transmission between the virtual machines 6 so as to be able to perform switching using the virtual switches 40 if virtual machines 6 coupled to a certain virtual network 16 are present on the same host computer 4.

Furthermore, the management apparatus 14 detects migration of the virtual machine 6 while working with the virtualization base management apparatus 15, and generates a virtual port 5 in the virtual switch 40 on the destination host computer 4 using the virtual port name for when the virtual machine 6 is coupled to the virtual switch on the source host computer 4.

Then, the management apparatus 14 allocates a VLAN 9 usable in the VLAN domain 8 to which the virtual port 5 is migrated, and couples the VLAN 9 to the virtual network through the intermediate IF 70 in the virtual network gateway apparatus 2 such that the VLAN 9 is coupled to the same local virtual network 7 as before migration.

In this manner, the virtual machine 6 can be migrated while being coupled to the same virtual network 16 across one or more VLAN domains 8 and one or more data centers 3400.

In the embodiment above, an example was described in which the hypervisor 41 is used as the virtualization unit, but a virtual machine monitor (VMM) may be used.

In the embodiment above, an example was described in which the management apparatus 14 and the virtualization base management apparatus 15 are separate computers, but the management apparatus 14 and the virtualization base management apparatus 15 may comprise one management computer. It is possible to provide the network mapping function 31 (network mapping unit) of the management apparatus 14, and the virtualization management unit of the virtualization base management apparatus 15 as functions to control the hypervisor 41 in one management computer.

The present invention is not limited to the embodiment above, and includes various modification examples. The embodiment above was described in detail in order to explain the present invention in an easy to understand manner, but the present invention is not necessarily limited to including all configurations described, for example. It is possible to replace a portion of the configuration of one embodiment with the configuration of another embodiment, and it is possible to add to the configuration of the one embodiment a configuration of another embodiment. Additionally, the addition, removal, or replacement of other configurations in place of a portion of the configuration of each embodiment can be done individually or in combination.

Some or all of the respective configurations, functions, processing units, processing means, and the like can be realized with hardware such as by designing an integrated circuit, for example. Additionally, the respective configurations, functions, and the like can be realized by software by the processor interpreting programs that execute the respective functions and executing such programs. Programs, tables, files, and the like that realize the respective functions can be stored in a storage device such as memory, a hard disk, or a solid state drive (SSD), or in a storage medium such as an IC card, an SD card, or a DVD.

Control lines and data lines regarded as necessary for explanation have been described, but not all control lines and data lines in the product have necessarily been shown. In reality, almost all configurations can be thought of as coupled to each other.

What is claimed is:
1. A network system, comprising:
a first gateway apparatus set in a network;
a first physical computer coupled to the first gateway apparatus, and which is configured to execute:
a first virtualization unit that allocates computer resources of the first physical computer to a plurality of virtual machines; and
a management computer that manages the first physical computer, the first virtualization unit, and the first gateway apparatus,
wherein the management computer is configured to:
control the first gateway apparatus by configuring settings in a virtual network coupled to the first gateway apparatus and a second gateway apparatus through the network and a plurality of VLANs coupled to the virtual network, and
control the first virtualization unit on the basis of the settings in the virtual network,
wherein the first virtualization unit is configured to manage:
a plurality of first virtual ports coupled to the virtual machines; and a first virtual switch that configures settings for the VLANs coupling the first virtual ports to the first gateway apparatus, and allocates different ones of the VLANs to different ones of the first virtual ports, wherein the first gateway apparatus includes an intermediate interface that couples one or more of the VLANs to the virtual network, converts transmissions between a format of the VLANs and a format of the virtual network and forwards the transmissions to the second gateway apparatus coupled through the virtual network on the basis of a command from the management computer, wherein the first virtual switch is configured to perform a switching process for transmissions transmitted between the virtual machines, and wherein the management computer offloads the switching process from the first virtual switch to the first gateway apparatus, and thereafter, the first gateway apparatus is configured to perform the switching process for the transmissions between the virtual machines.

2. The network system according to claim 1, wherein the management computer offloads the switching process from the first virtual switch to the first gateway apparatus, and thereafter, the first virtual switch is configured to forward the transmissions between the virtual machines to the first gateway apparatus, and the first gateway apparatus is configured to perform the switching process for the transmissions forwarded from the first virtual switch.

3. The network system according to claim 1, wherein the transmissions between the virtual machines are packets, and wherein the transmissions forwarded to the second gateway apparatus are packets which have been converted from the format of the VLANs to the format of the virtual network.

4. The network system according to claim 1, wherein the management computer, upon receiving a request to offload the switching process, is further configured to send a command to the first gateway apparatus to modify a mapping of the VLANs and the first virtual ports and to send a command to the first virtualization unit to change the allocation of the VLANs and the first virtual ports, and wherein the first virtualization unit offloads the switching process from the first virtual switch to the first gateway apparatus on the basis of the command to the first gateway apparatus and the command to the first virtualization unit.

5. The network system according to claim 1, further comprising:

a second physical computer coupled to the second gateway apparatus, and which is configured to execute:

a second virtualization unit that is configured to manage:

a plurality of second virtual ports; and a second virtual switch that configures settings for the VLANs coupling the second virtual ports to the second gateway apparatus, and allocates different ones of the VLANs to different ones of the second virtual ports, wherein the management computer, upon receiving a command to migrate a first virtual machine of the virtual machines from the first physical computer to the second physical computer, migrates the first virtual machine to the second virtualization unit of the second physical computer, and then issues a command to the second virtualization unit of the second physical computer to allocate one of the second virtual ports and one of the VLANs to the migrated first virtual machine at the second virtual switch, and wherein the one of the VLANs is coupled to a same local virtual network to which the one of the VLANs was coupled to prior to the migration of the first virtual machine.

6. The network system according to claim 5, wherein the management computer allocates to the one of the second virtual ports of the second virtual switch to which the first virtual machine is to be migrated a same identifier as one of the first virtual ports from which the first virtual machine was migrated.

7. The network system according to claim 1, wherein the first gateway apparatus is disposed in a first data center different from a second data center in which the second gateway apparatus is disposed.

8. A method of managing a network system including a first gateway apparatus set in the network, a first physical computer coupled to the first gateway apparatus, a first virtualization unit that allocates computer resources of the first physical computer to a plurality of virtual machines, and a management computer that manages the first physical computer, the first virtualization unit, and the first gateway apparatus, the method comprising:

controlling, by the management computer, the first gateway apparatus by configuring settings for a virtual network coupled to the first gateway apparatus and a second gateway apparatus through the network and a plurality of VLANs coupled to the virtual network, the first gateway apparatus that coupling one or more of the VLANs to the virtual network;

controlling, by the management computer, the first virtualization unit on the basis of the settings for the virtual network;

managing, by the first virtualization unit, a plurality of first virtual ports to which the first virtual machines are coupled and a virtual switch that configures settings for the VLANS coupling the first virtual ports to the first gateway apparatus, where different ones of the VLANs are allocated to different ones of the first virtual ports, based on a command from the management computer;

converting, by an intermediate interface of the first gateway apparatus, transmissions between a format of the VLANs and a format of the virtual network and forwarding the transmissions to the second gateway apparatus coupled through the virtual network on the basis of a command from the management computer;

performing, by the first virtual switch, a switching process for transmissions between the virtual machines;

offloading, by the management computer, the switching process from the first virtual switch to the first gateway apparatus, and thereafter, performing, by the first gateway apparatus, the switching process for the transmissions between the virtual machines.

9. The method of managing a network system according to claim 8, wherein, after offloading the switching process to the first gateway apparatus, the first virtual switch forwards the transmissions between the virtual machines to the first gateway apparatus, and the first gateway apparatus performs the switching process for the transmissions forwarded from the first virtual switch.

10. The method of managing a network system according to claim 8, wherein the transmissions between the virtual machines are packets, and wherein the transmissions forwarded to the second gateway apparatus are packets which have been converted from the format of the VLANs to the format of the virtual network.

11. The method of managing a network system according to claim 8, wherein, upon receiving a request to offload the switching process, the management computer sends a command to the first gateway apparatus to modify a mapping of the VLANs and the first virtual ports and sends a command to the first virtualization unit to change the allocation of the VLANs and the first virtual ports, and wherein the first virtualization unit offloads the switching process from the first virtual switch to the first gateway apparatus on the basis of the command to the first gateway apparatus and the command to the first virtualization unit.

12. The method of managing a network system according to claim 8, wherein the network system further includes a second physical computer coupled to the second gateway apparatus, a second virtualization unit that manages a plurality of second virtual ports and a second virtual switch that configures settings for the VLANs coupling the second virtual ports to the second gateway apparatus, and allocates different ones of the VLANs to different ones of the second virtual ports, wherein the management computer, upon receiving a command to migrate a first virtual machine of the virtual machines from the first physical computer to the second physical computer, migrates the first virtual machine to the second virtualization unit of the second physical computer, and then issues a command to the second virtualization unit of the second physical computer to allocate one of the second virtual ports and one of the VLANs to the migrated first virtual machine at the second virtual switch, and wherein the one of the VLANs is coupled to a same local virtual network to which the one of the VLANs was coupled to prior to the migration of the first virtual machine.

13. The method of managing a network system according to claim 12, wherein the management computer allocates to the one of the second virtual ports of the second virtual switch to which the first virtual machine is to be migrated a same identifier as one of the first virtual ports from which the first virtual machine was migrated.

14. The method of managing a network system according to claim 8, wherein the first gateway apparatus is disposed in a first data center different from a second data center in which the second gateway apparatus is disposed.

* * * * *